(12) United States Patent
O'Boyle

(10) Patent No.: US 10,704,840 B2
(45) Date of Patent: Jul. 7, 2020

(54) FLEXIBLE SEAL FOR A ROTARY REGENERATIVE PREHEATER

(71) Applicant: Arvos Ljungstrom LLC, Wellsville, NY (US)

(72) Inventor: Jeffrey O'Boyle, Wellsville, NY (US)

(73) Assignee: ARVOS LJUNGSTROM LLC, Wellsville, NY (US)

( * ) Notice: Subject to any disclaimer, the term of this patent is extended or adjusted under 35 U.S.C. 154(b) by 0 days.

(21) Appl. No.: 16/325,469

(22) PCT Filed: Feb. 10, 2017

(86) PCT No.: PCT/US2017/017414
§ 371 (c)(1),
(2) Date: Feb. 14, 2019

(87) PCT Pub. No.: WO2018/034694
PCT Pub. Date: Feb. 22, 2018

(65) Prior Publication Data
US 2019/0212069 A1 Jul. 11, 2019

Related U.S. Application Data

(63) Continuation of application No. PCT/US2016/047318, filed on Aug. 17, 2016.

(51) Int. Cl.
*F28D 19/00* (2006.01)
*F28D 19/04* (2006.01)
(Continued)

(52) U.S. Cl.
CPC ........ *F28D 19/047* (2013.01); *F16J 15/3232* (2013.01); *F16J 15/3268* (2013.01); *F16J 15/3292* (2013.01); *F28F 2230/00* (2013.01)

(58) Field of Classification Search
CPC .. F28D 19/047; F16J 15/3232; F16J 15/3268; F16J 15/3292; F16J 15/3224;
(Continued)

(56) References Cited

U.S. PATENT DOCUMENTS 1,746,598 A * 2/1930 Ljungstrom ............ F28D 19/04
165/9
3,698,429 A * 10/1972 Lowe ...................... F16K 1/165
137/601.06
(Continued)

FOREIGN PATENT DOCUMENTS

DE 2451247 A1 5/1976
GB 2515531 A 12/2014

OTHER PUBLICATIONS

Notification of International Search and Written Opinion issued in corresponding PCT Application No. PCT/US2017/017414, dated Nov. 7, 2017, pp. 1-18.
(Continued)

*Primary Examiner* — Travis C Ruby
(74) *Attorney, Agent, or Firm* — Murtha Cullina LLP

(57) ABSTRACT

A seal assembly includes a first leaf with a spacer secured proximate a distal end of the first leaf. The spacer extends along the first leaf from an outboard end of the spacer to an inboard end thereof. The seal assembly includes a second leaf that is secured to the spacer so that the distal end is positioned proximate the outboard end of the spacer. The second leaf has an elongate section that extends away from the distal end. The elongate section extends beyond the inboard end of the spacer and terminates along the first bend of the first leaf, so that a portion of the second leaf proximate the terminus of the second leaf is slidingly moveable relative to and in compressive engagement with a portion of the first
(Continued)

bend, and a portion of the second elongate section is spaced apart from the first elongate section.

14 Claims, 23 Drawing Sheets

(51) Int. Cl.
  *F16J 15/3232* (2016.01)
  *F16J 15/3268* (2016.01)
  *F16J 15/3292* (2016.01)
(58) Field of Classification Search
  CPC ... F16J 15/3252; F16J 15/025; F28F 2230/00; F24F 2003/1464
  See application file for complete search history.

(56) References Cited

U.S. PATENT DOCUMENTS

| | | | | |
|---|---|---|---|---|
| 3,743,008 A * | 7/1973 | Zeek | ............... | F28D 19/047 165/9 |
| 3,805,882 A * | 4/1974 | Vallance | ............... | F28D 19/047 165/9 |
| 3,913,926 A * | 10/1975 | Rao | ............... | F28D 19/047 165/9 |
| 3,954,135 A * | 5/1976 | Hewlitt | ............... | F28D 19/047 165/9 |
| 4,071,076 A * | 1/1978 | Sakaki | ............... | F28D 19/047 165/9 |
| 4,098,323 A * | 7/1978 | Wiegard | ............... | F28D 19/047 165/9 |
| 4,593,750 A * | 6/1986 | Finnemore | ............... | F28D 19/047 165/5 |
| 4,673,026 A | 6/1987 | Hagar | | |
| 4,791,980 A * | 12/1988 | Hagar | ............... | F28D 19/047 165/9 |
| 5,005,634 A * | 4/1991 | Reeves | ............... | F28D 19/047 165/9 |
| 5,425,543 A * | 6/1995 | Buckshaw | ............... | F16J 15/3288 165/9 |
| 5,542,684 A * | 8/1996 | Squirrell | ............... | F16K 1/16 277/411 |
| 5,697,619 A * | 12/1997 | Fierle | ............... | F28D 19/047 165/9 |
| 6,702,295 B1 * | 3/2004 | Kapcoe | ............... | F16J 15/3228 277/551 |
| 6,789,605 B1 | 9/2004 | Kaser | | |
| 8,157,266 B2 * | 4/2012 | Klisura | ............... | F28D 19/047 277/355 |
| 8,776,864 B2 * | 7/2014 | Klisura | ............... | F23L 15/02 165/9 |
| 8,806,750 B2 * | 8/2014 | Hurtado | ............... | F16J 15/3224 165/8 |
| 10,295,273 B2 * | 5/2019 | O'Boyle | ............... | F28D 19/047 |
| 2007/0138750 A1 * | 6/2007 | Warnecke | ............... | F16J 15/14 277/549 |
| 2009/0145574 A1 * | 6/2009 | Klisura | ............... | F23L 15/02 165/8 |
| 2011/0036536 A1 * | 2/2011 | Klisura | ............... | F23L 15/02 165/9 |
| 2011/0037236 A1 * | 2/2011 | Klisura | ............... | F28D 19/047 277/650 |
| 2013/0327495 A1 | 12/2013 | Hastings | | |

OTHER PUBLICATIONS

Notification of Transmittal of International Preliminary Report on Patentability issued in corresponding PCT Application No. PCT/US2017/017414, dated Nov. 26, 2018, pp. 1-11.

* cited by examiner

FLEXIBLE SEAL FOR A ROTARY REGENERATIVE PREHEATER

CROSS REFERENCE TO RELATED APPLICATIONS

The instant application is a U.S. National Stage of and claims priority to PCT/US2017/017414 for "Flexible Seal for a Rotary Regenerative Preheater" filed on Feb. 10, 2017, which is a continuation application of and claims priority to PCT/US2016/047318, filed on Aug. 17, 2016, the subject matter of both aforementioned applications are hereby incorporated by reference in their entireties.

TECHNICAL FIELD

This invention relates to an improved flexible seal for a rotary regenerative preheater, and more particularly to a flexible seal having two leafs, a spacer, wear resistant members and/or discharge openings in portions of the flexible seal for removing materials undesirably accumulated in the flexible seal.

BACKGROUND

As shown in FIG. 1, a rotary regenerative air preheater (hereinafter referred to as the "preheater") is generally designated by the numeral 10. The preheater 10 includes a rotor assembly 12 rotatably mounted on a rotor post 16. The rotor assembly 12 is positioned in and rotates relative to a housing 14. For example, the rotor assembly 12 is rotatable about an axis A of the rotor post 16 in the direction indicated by the arrow R. The rotor assembly 12 includes partitions 18 (e.g., diaphragms) extending radially from the rotor post 16 to an outer periphery of the rotor assembly 12. Adjacent pairs of the partitions 18 define respective compartments 20 for receiving a heat transfer assembly 1000. Each of the heat transfer assemblies 1000 include a plurality of heat transfer sheets 100 and/or 200 stacked upon one another.

As shown in FIG. 1, preheater 10 is a bisector configuration in which the housing 14 includes a flue gas inlet duct 22 and a flue gas outlet duct 24 for channeling the flow of heated flue gases through the preheater 10. The housing 14 further includes an air inlet duct 26 and an air outlet duct 28 for channeling the flow of combustion air through the preheater 10. The preheater 10 includes an upper sector plate 30A extending across the housing 14 adjacent to an upper face of the rotor assembly 12. The preheater 10 includes a lower sector plate 30B extending across the housing 14 adjacent to lower face of the rotor assembly 12. The upper sector plate 30A extends between and is joined to the flue gas inlet duct 22 and the air outlet duct 28. The lower sector plate 30B extends between and is joined to the flue gas outlet duct 24 and the air inlet duct 26. The upper and lower sector plates 30A and 30B, respectively, are joined to one another by a circumferential plate 30C. The upper sector plate 30A and the lower sector plate 30B divide the preheater 10 into an air sector 32 and a gas sector 34.

As illustrated in FIG. 1, the arrows marked 'A' indicate the direction of a flue gas stream 36 through the gas sector 34 of the rotor assembly 12. The arrows marked 'B' indicate the direction of a combustion air stream 38 through the air sector 32 of the rotor assembly 12. The flue gas stream 36 enters through the flue gas inlet duct 22 and transfers heat to the heat transfer assembly 1000 mounted in the compartments 20. The heated heat transfer assembly 1000 is rotated into the air sector 32 of the preheater 10. Heat stored in the heat transfer assembly 1000 is then transferred to the combustion air stream 38 entering through the air inlet duct 26. Thus, the heat absorbed from the hot flue gas stream 36 entering into the preheater 10 is utilized for heating the heat transfer assemblies 1000, which in turn heats the combustion air stream 38 entering the preheater 10.

As shown in FIG. 2, a prior art seal 40 extends axially from (i.e., parallel to the axis A) and radially along an edge of each of the diaphragms 18 towards the sector plate 30A. Another seal 40 extends axially from and radially along an opposite side of each of the diaphragms 18 towards the sector plate 30B (only one seal 40 shown in FIG. 1). The seal 40 typically includes a flexible seal leaf 42 having a base portion 42B that is positioned between an L-shaped backing bar 43 and an elongate holding bar 41. A base portion 41B of the holding bar 41, the base portion 42B of the flexible seal 42 and a base portion 43B of the backing bar 43 are secured by a plurality of bolts 45 and nuts 46 between a spacer bar 44 and the diaphragm 18, radially along a length of the diaphragm 18.

During operation of the preheater 10, a surface 31' of the sector plates 30A and 30B is spaced apart from a distal end of the seal 40. However, during start-up conditions when the preheater 10 and ducts 22, 24, 26 and 28 are relatively cold, the surface 31 of the sector plates 30A and 30B slidingly engage the respective seal 40. Such sliding engagement causes the flexible seal leaf 42 to wear and results in bypass leakage between the air sector 32 and the gas sector 34. In addition, through laboratory testing, the inventors have surprisingly found that such sliding engagement of the seal 40 with the respective sector plate 30A and 30B results in oscillatory vibration of the seal 40, as indicated by the arrow V, causing fatigue failure thereof. In addition, the inventors have discovered that because the seal 40 is mounted on a leading edge of the diaphragm 18, the edge of the diaphragm 18 acts as an abrupt fulcrum 47 upon which the seal 40 is bent over and causes stress concentrations at the mating portion of the seal 40. Such stress concentrations cause premature failure of the seal 40.

In addition, International Publication No. WO 97/37186 A1 discloses an arrangement in an air preheater for maintaining a controlled gap between a flexible sealing member and a sector plate at full load operating conditions to reduce leakage and sealing surface wear; and to provide a means to eliminating gapping between the sealing surface and the flexible sealing member in an air preheater due to deflection caused by gas pressure differentials, means for preventing premature failure due to edge fracturing of the flexible sealing member, and means for eliminating gaps between adjacent segments of the flexible sealing member.

Japanese Patent Application No. S59 231396 A discloses a front plate is detachably attached to an upper selector plate. An elastic thin plate sealing member is detachably attached on a back portion of the front plate 6. The back plate is detachably attached on the back portion of the elastic thin plate sealing member so that the deformation curvature of the elastic thin plate sealing member is limited.

U.S. Patent Application Publication No. US 2013/105105 A1 discloses a bimetallic seal for an air heater to flex and close a gap as the temperature changes using a laminated metal/bimetallic seal that deflects to provide a seal to control leakage.

SUMMARY OF THE INVENTION

There is disclosed herein an improved seal assembly for a rotary preheater. The seal assembly includes a first leaf that has a first base section and a first elongate section extending away from the first base section. The first elongate section terminates at a first distal end of the first leaf. The first leaf has a first bend located between the first base section and the first elongate section. A spacer is secured to the first leaf proximate the distal end of the first leaf. The spacer extends along a portion of the first elongate section of the first leaf. The spacer has a length that extends from an outboard or distal end thereof to an inboard end thereof. The inboard end of the spacer is positioned along the first elongate section of the first leaf. The seal assembly includes a second leaf that has a second distal end. The second leaf is secured to the spacer so that the second distal end is positioned proximate the spacer (e.g., proximate the outboard end of the spacer). The second leaf has second elongate section that extends away from the second distal end towards the first base section of the first leaf. The second elongate section extends beyond the inboard end of the spacer and terminates along the first bend of the first leaf, at a terminus of the second leaf, so that a portion of the second leaf proximate the terminus of the second leaf is slidingly moveable relative to and in compressive engagement with a portion of the first bend and a portion of the second elongate section is spaced apart from the first elongate section.

In one embodiment, the seal assembly includes an extension member (e.g., an L-shaped strip) that is secured to the first leaf and extends outwardly from the distal end. In one embodiment, the extension member has an outside corner thereon. In one embodiment, the outside corner has a wear resistant material (e.g., hardfacing) applied thereto.

In one embodiment, the extension member has a base portion that engages the first leaf. The base portion extends to and terminates at the inboard end of the spacer.

In one embodiment, the seal assembly includes one or more displacement members (e.g., holding bar). The displacement members each have a first engagement portion (e.g., linear elongate section) that slidingly engages a portion (e.g., linear elongate section) of the extension member. In one embodiment, the extension member has a base portion that has a predetermined thickness configured to displace the first leaf away from the displacement member to impart a preload force on the first leaf. In one embodiment, the displacement members have a bent cross sectional shape configured to impart the preload force on the first leaf and space the displacement members apart from the first bend of the first leaf. In one embodiment, the displacement members have a second base section that is configured to be secured to the first base section of the first leaf.

In one embodiment, the seal assembly further includes a strip (e.g., a backing bar) that has a third base section which engages the first base section of the first leaf. The first base section is positioned between the second base section of the displacement members and the third base section of the strip. The strip defines a deflector section which extends away from the third base section and apart from the second leaf. In one embodiment, the strip includes a plurality of openings (e.g., holes, ports, slits or the like) extending therethrough. The openings are configured as discharge ports for discharge or removal of material accumulated between the strip and the first leaf and/or the second leaf.

In one embodiment, the seal assembly includes a mounting bracket configured to orient the first base section of the first leaf at an angle of about 5 to 80 degrees from a vertical reference line, to set a preload force of the seal assembly against a seal plate of the rotary preheater.

In one embodiment, the first leaf is oriented at an angle from about 30 degrees to 60 degrees relative to a vertical line.

In on embodiment, the first leaf is configured to impart a substantially constant force on a seal plate over a range of operating loads, for mitigation of wear of the seal assembly.

There is further disclosed herein at another seal assembly for a rotary preheater. The seal assembly includes one or more leafs which have a first base section. The first base section includes a fastening area for securing the leaf to a diaphragm of the preheater. The leaves each have a first elongate section which extends away from the first base section. The seal assembly includes a strip (e.g., a backing bar) that has a third base section. The third base section engages the first base section of the first leaf. The strip has a second elongate section which extends away from the third base section of the strip. A cavity (e.g., opening, crevice or the like) is formed between the first elongate section of the first leaf and the second elongate section of the strip. The strip includes a plurality of openings extending therethrough. The openings are configured as discharge ports for discharge of material (e.g., fly ash) accumulated in the cavity.

DETAILED DESCRIPTION

Figure 3:
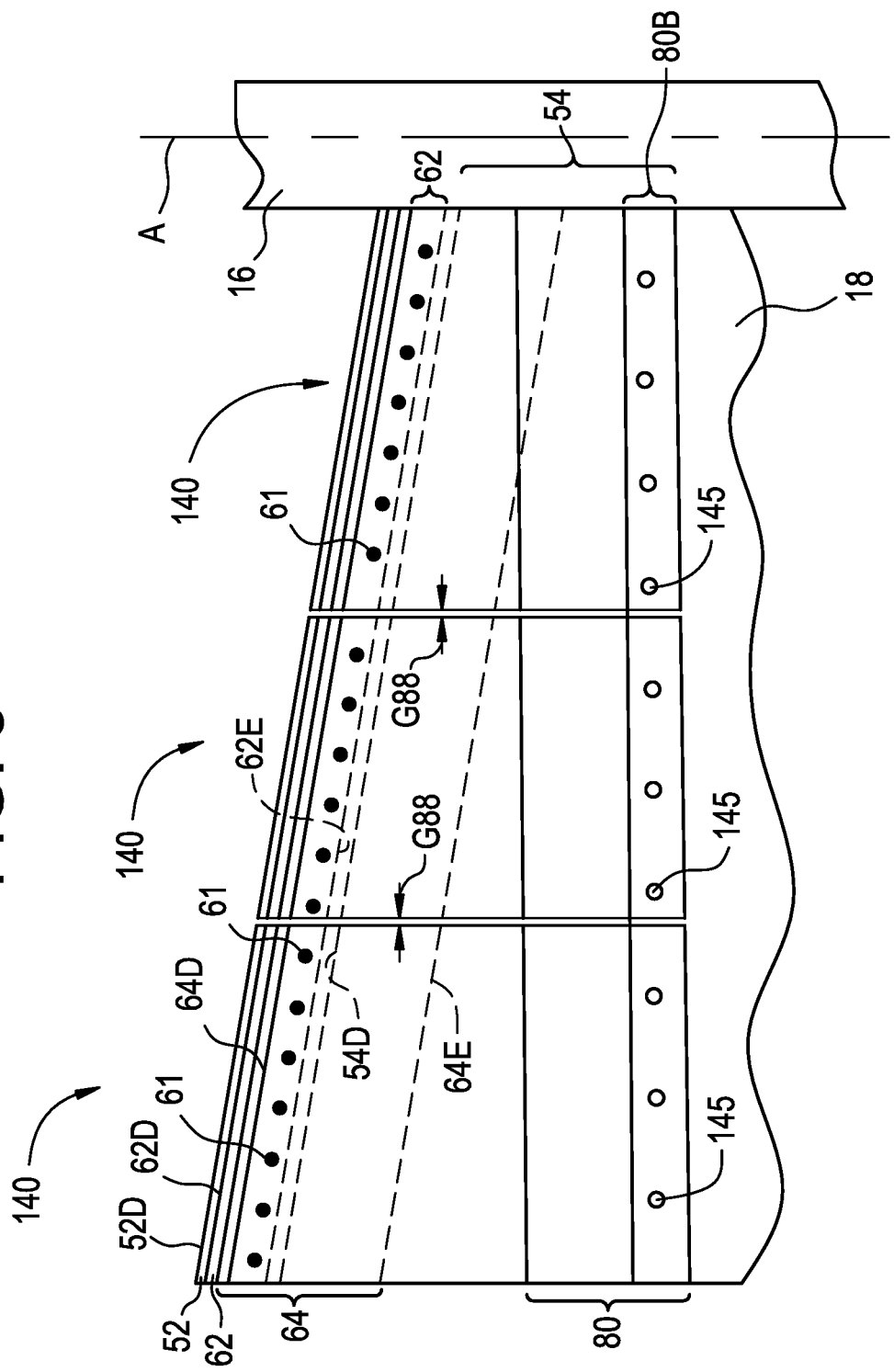
FIG. 3 is a plan view of a seal assembly viewed from a trailing side of the diaphragm.
Figure 4:
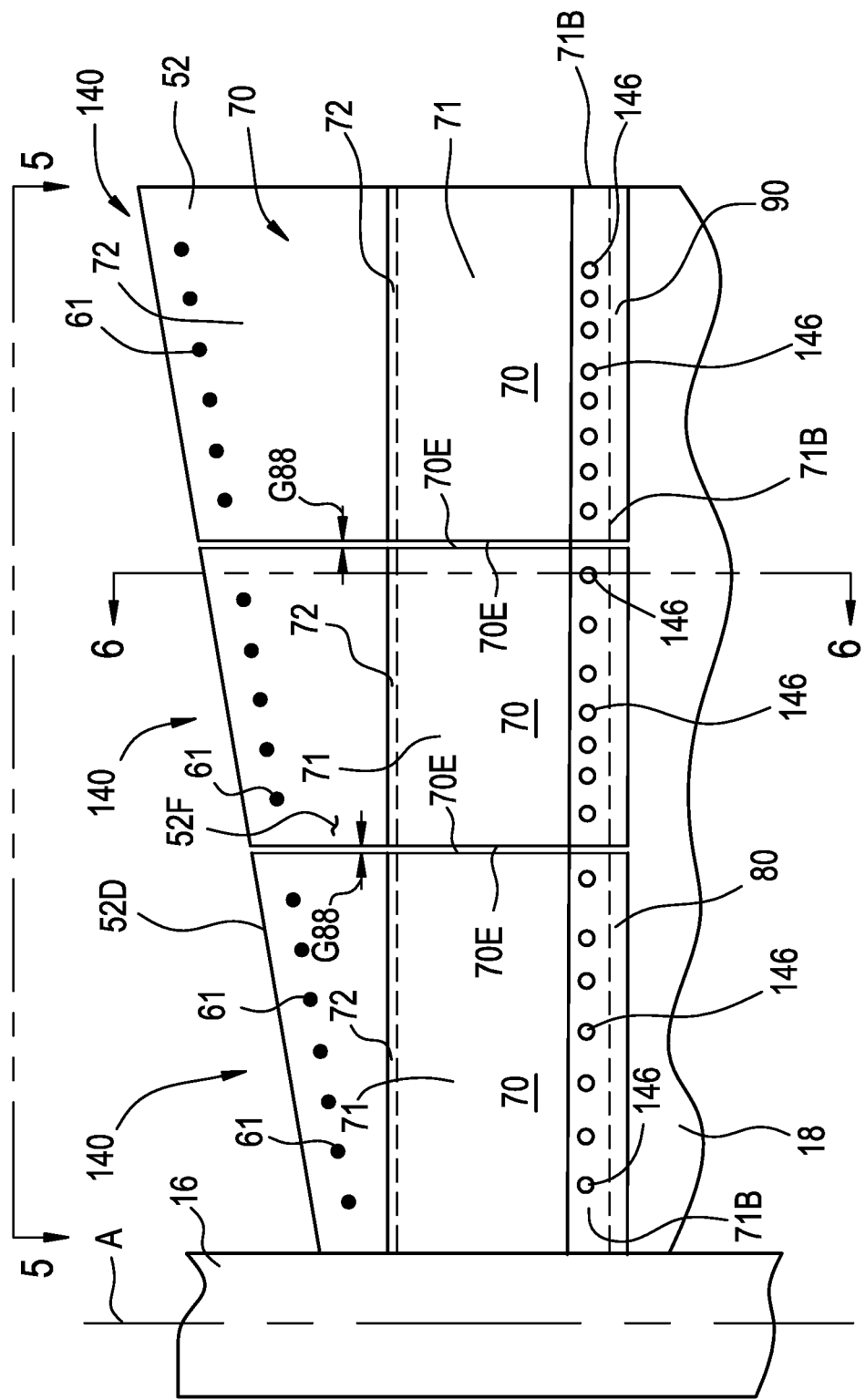
FIG. 4 is a plan view of a seal assembly viewed from a leading side of the diaphragm.
Figure 5:
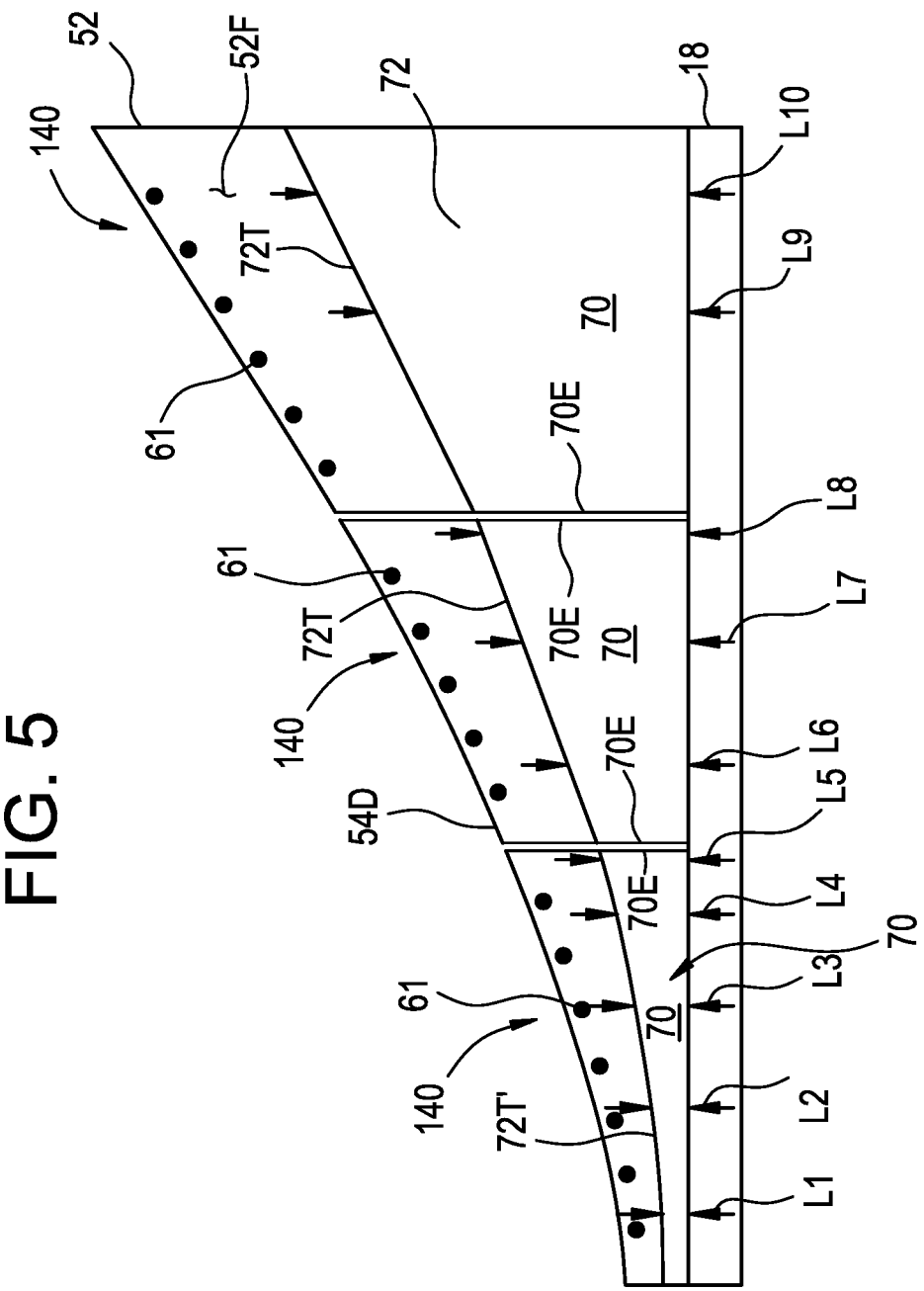
FIG. 5 is a top view of the seal assembly of FIG. 4 taken across line 5-5 of FIG. 4.
Figure 6:
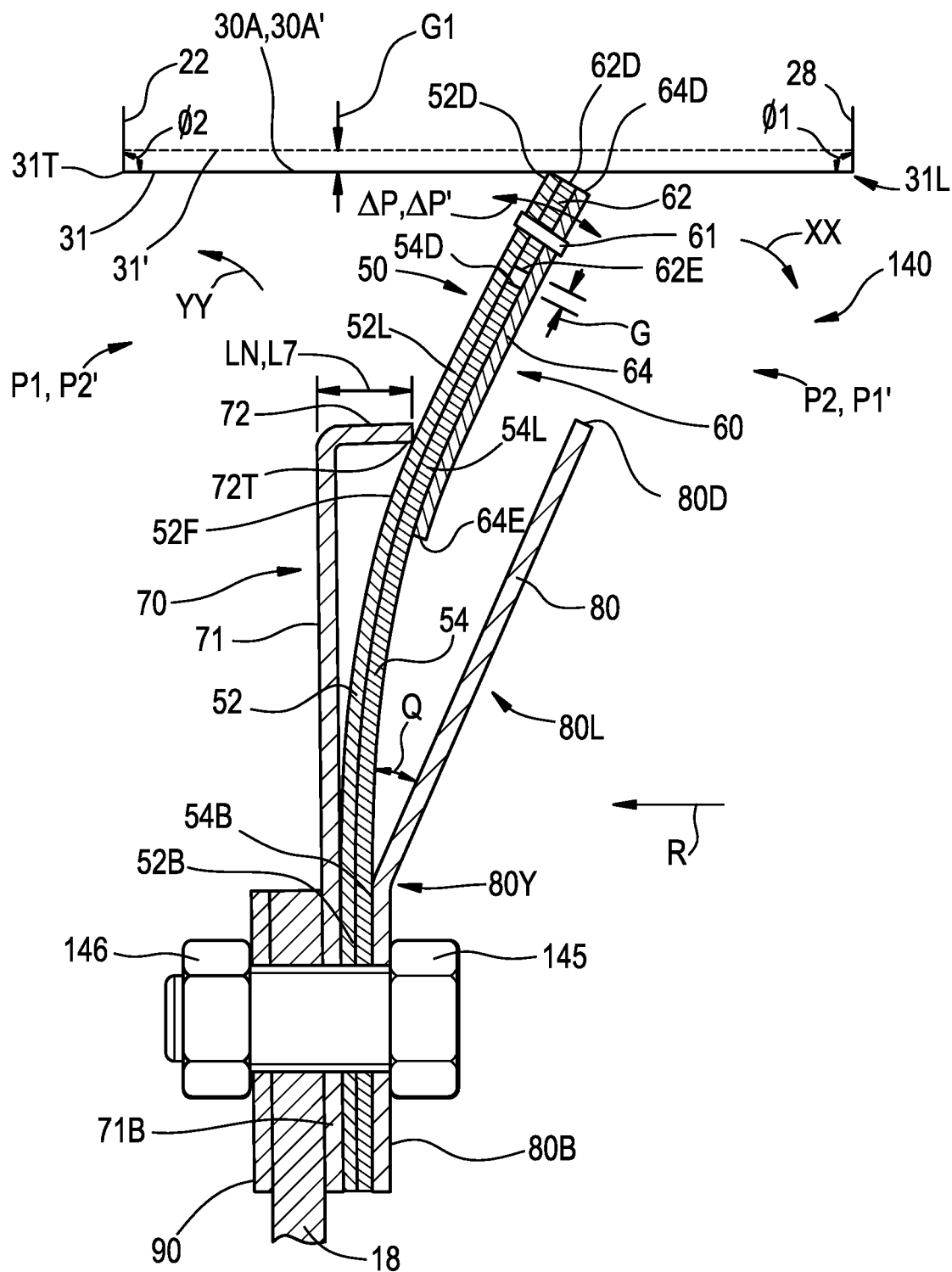
FIG. 6 is a cross sectional view of the seal assembly of FIG. 4 taken across line 6-6 of FIG. 4.

As shown in FIG. 6, a seal assembly is generally designated by the numeral 140. As shown in FIGS. 3-5 three of the seal assemblies 140 are secured, in a radially segmented configuration, to opposing axially edges of each of the diaphragms 18 of the bisector type preheater of FIG. 1 by a suitable fastener system such as a plurality of bolts 145 and nuts 146. However, other methods of fastening the seal assemblies 140 to the diaphragms 18 may be employed such as but not limited to welding and brazing. Each of the seal assemblies 140 are a generally elongate member that extends between the rotor post 16 and a radially outward peripheral edge of the diaphragm 18, as shown in FIGS. 3 and 4. While the seal assembly 140 is described as being employed in a bisector type preheater, the seal assembly 140 is not limited in this regard as the seal assembly may be employed in a tri-sector or quad sector preheater, without departing from the broader aspects disclosed herein.

Referring to FIG. 6, each of the seal assemblies 140 includes a leaf assembly 50 having a first leaf 52 having a first base section 52B. The first base section 52B defines a first fastening area, for example, a flat section and a bore extending therethrough for receiving one of the bolts 145 for securing the first leaf 52 to the diaphragm 18 of the preheater 10 of FIG. 1. The first leaf 52 has a first elongate section 52L extending away from the first base section 52B and terminating at a first distal end 52D thereof.

Referring to FIG. 6, each of the seal assemblies 140 includes a second leaf 54 engaging a portion of the first leaf 52 and having a second base section 54B. The second base section 54B defines a second fastening area, for example, a flat section and a bore extending therethrough for receiving one of the bolts 145 for securing the second leaf 54 to the diaphragm 18 of the preheater 10 of FIG. 1. The second leaf 54 has a second elongate section 54L extending away from the second base section 54B and terminating at a second distal end 54D thereof. The second distal end 54D terminates along a length of the first leaf 52 between the first distal end 52D and the first base section 52B of the first leaf 52.

Figure 10:
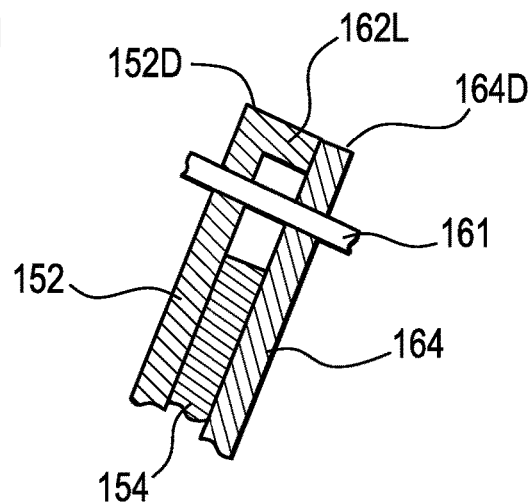
FIG. 10 is a cross sectional view of a portion of another embodiment of the seal assembly of FIG. 6 wherein the spacer is formed by a bend in a first leaf.
Figure 11:
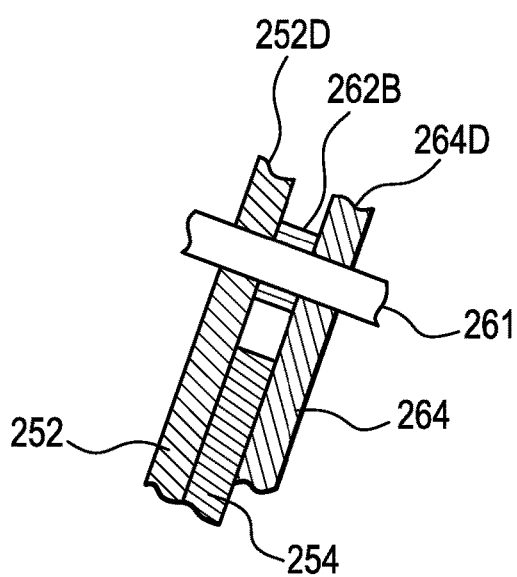
FIG. 11 is a cross sectional view of a portion of another embodiment of the seal assembly of FIG. 6 wherein the spacer is formed by rivets and spacer rings.
Figure 12:
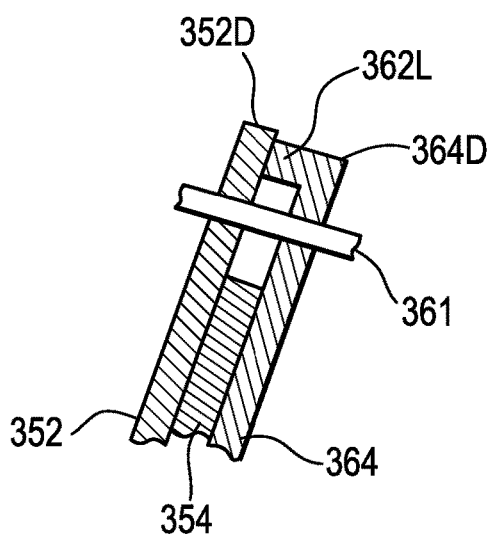
FIG. 12 is a cross sectional view of a portion of another embodiment of the seal assembly of FIG. 6 wherein the spacer is formed by a bend in a second leaf.

As shown in FIG. 6, each of the seal assemblies 140 includes a supplemental leaf assembly 60 secured to (e.g., via suitable fastening structures 61 such as rivets or spot welds) the first leaf 52 and slidingly engages the second leaf 54. The supplemental leaf assembly 60 includes a spacer 62 (e.g., a spacer leaf) secured to (e.g., via the fastening structures 61) the first leaf 52. The spacer 62 defines a distal end 62D. The supplemental leaf assembly 60 includes a third leaf 64 secured to (e.g., via the fastening structures 61) the spacer 62. The third leaf 64 slidingly engages a portion of the second leaf 54. The third leaf 64 defines a third distal end 64D. The spacer 62 is positioned between the first leaf 52 and the third leaf 64. The spacer 62 is spaced apart from the second distal end 54D thereby defining a gap G between the spacer 62 and the second distal end 54D to accommodate movement of the spacer 62 relative to the second distal end 54D. While the spacer 62 is described and shown in FIG. 6 as being a leaf, the spacer is not limited in this regard as other spacer configurations may be employed including but not limited to: 1) a spacer 162L formed as a leg as a result of a bend 152D in the first leaf 152 as shown in FIG. 10; 2) a spacer ring 262B disposed around a rivet 261 and positioned between the first leaf 252 and a third leaf 264 as shown in FIG. 11; and 3) a spacer 362L formed as a leg as a result of a bend 364D in the third leaf 364 as shown in FIG. 12. The inventors have surprisingly discovered that the sliding engagement of the third leaf 64 with the portion of the second leaf 54 increases the performance and life of the seal assembly 140 by reducing vibrations compared to prior art single leaf seals or improvements with only two leaves.

As shown in FIG. 6, in one embodiment the distal ends 52D, 62D and 64D are aligned with one another. In the configuration shown in FIG. 6, the distal end 52D of the first leaf 52 is shown slidingly engaging the surface 31 of the sector plate 30A during reduced (e.g., 30 percent load or less) or zero load operation. Another of the spacers 62 of a seal assembly 140, positioned on an opposite side of the diaphragm 18, slidingly engages the surface 31 of the sector plate 30B. For loads greater than 30 percent the distal end 54D is spaced apart from the surface 31' of the sector plate 30A by a gap G1 that reduces hot end radial seal gap by fifty percent at full load compared to the prior art seal assemblies 40.

Figure 9:
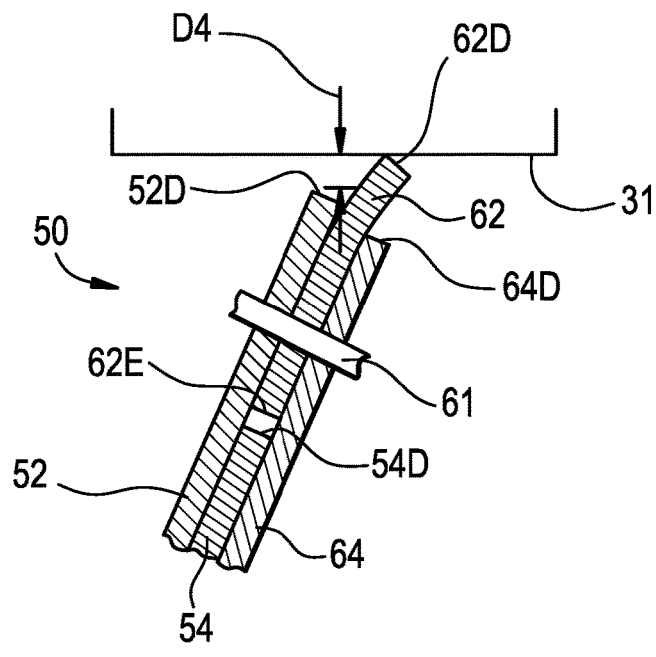
FIG. 9 is a cross sectional view of a portion of another embodiment of the seal assembly of FIG. 6 and having one leaf extending outwardly from the other leaves.

While in FIG. 6 the distal ends 52D, 62D and 64D are aligned with one another, the present disclosure is not limited in this regard as one or more of the distal ends 52D, 62D and 64D may extend outwardly from one another, as shown in FIG. 9 wherein the distal end 62D extends outwardly from the distal ends 52D and 64D. In one embodiment portions of the spacer 62 on and adjacent to the distal end 62 D are formed of a wear resistant configuration, such as, but not limited to a surface hardfacing weld overlay (e.g., a cobalt based weld material), a case hardened layer (e.g., nitriding, carburizing or other diffusion type hardening) and a precipitation hardened material. The spacer 62 slidingly engages the surface 31 of the sector plate 30A.

In one embodiment, the first leaf 52, the second leaf 54, the third leaf 62 and/or the fourth leaf 64 are manufactured from an austenitic stainless steel, for example a 301 stainless steel. In one embodiment the first leaf 52, the second leaf 54, the third leaf 62 and/or the fourth leaf 64 are about 0.02 to 0.025 inches thick.

As shown in FIGS. 3-5, three of the seal assemblies 140 are shown secured to the diaphragm 18 in a radially segmented configuration and are spaced apart from one another by gaps G88. However, the present disclosure is not limited in this regard as any number of seal assemblies 140 may be employed and spaced apart from one another by the gaps G88.

As shown in FIG. 4, each of the seal assemblies 140 includes a displacement member 70 having side edges 70E that are spaced apart from one another by the gap G88.

While three displacement members 70 are shown, the present disclosure is not limited in this regard as the displacement members 70 may be formed in one integral piece or any number of segments to facilitate installation. In one embodiment illustrated in FIG. 6, each of the plurality of displacement members 70 has an L-shaped configuration defining a first leg 71 and a second leg 72. The first leg defines a third base section 71B. The third base section 71B defines a third fastening area, for example, a flat section and a bore extending therethrough for receiving one of the bolts 145 for securing the displacement member 70 to the diaphragm 18 of the preheater 10 of FIG. 1.

As shown in FIG. 5, each of second legs 72 defines an engagement portion 72T configured to engage a surface 52F of the first leaf 52 and to displace a portion of the leaf assembly 50 a predetermined distance, as described further herein. Each of the engagement portions 72T have a contoured edge configuration. For example, the engagement portion 72T of the two radially outwardly positioned displacement members 70 have a linear tapered edge; and the engagement portion 72T' of the radially inner most positioned displacement member 70 has an arcuate edge that is complementary in shape to the surface 52F of the first leaf 52. However, any of the displacement members 70 may employ an arcuate edge and/or a linear tapered edge.

As shown in FIG. 6 the second leg 72 has a length LN (e.g., L7 shown in FIG. 6, L1-L10 shown in FIG. 5) extending between the first leg 71 and the engagement portion 72T. As shown in FIG. 5 each of L1-L10 are of a different length and displace the leaf assembly 50 a different magnitude. For example, the lengths L1-L10 progressively increase (i.e., L10 is greater than L9, L9 is greater than L8, L8 is greater than L7, L7 is greater than L6, L6 is greater than L5, L5 is greater than L4, L4 is greater than L3, L3 is greater than L2, L2 is greater than L1). The displacement members 70 are arranged to establish a predefined contour of the leaf assembly 50. The predetermined contour is configured to compensate for movement of the preheater 10 during operation. As shown in FIGS. 3 and 4, the first leaf 52 and the second leaf 54 have a trapezoidal shape.

Figure 1:
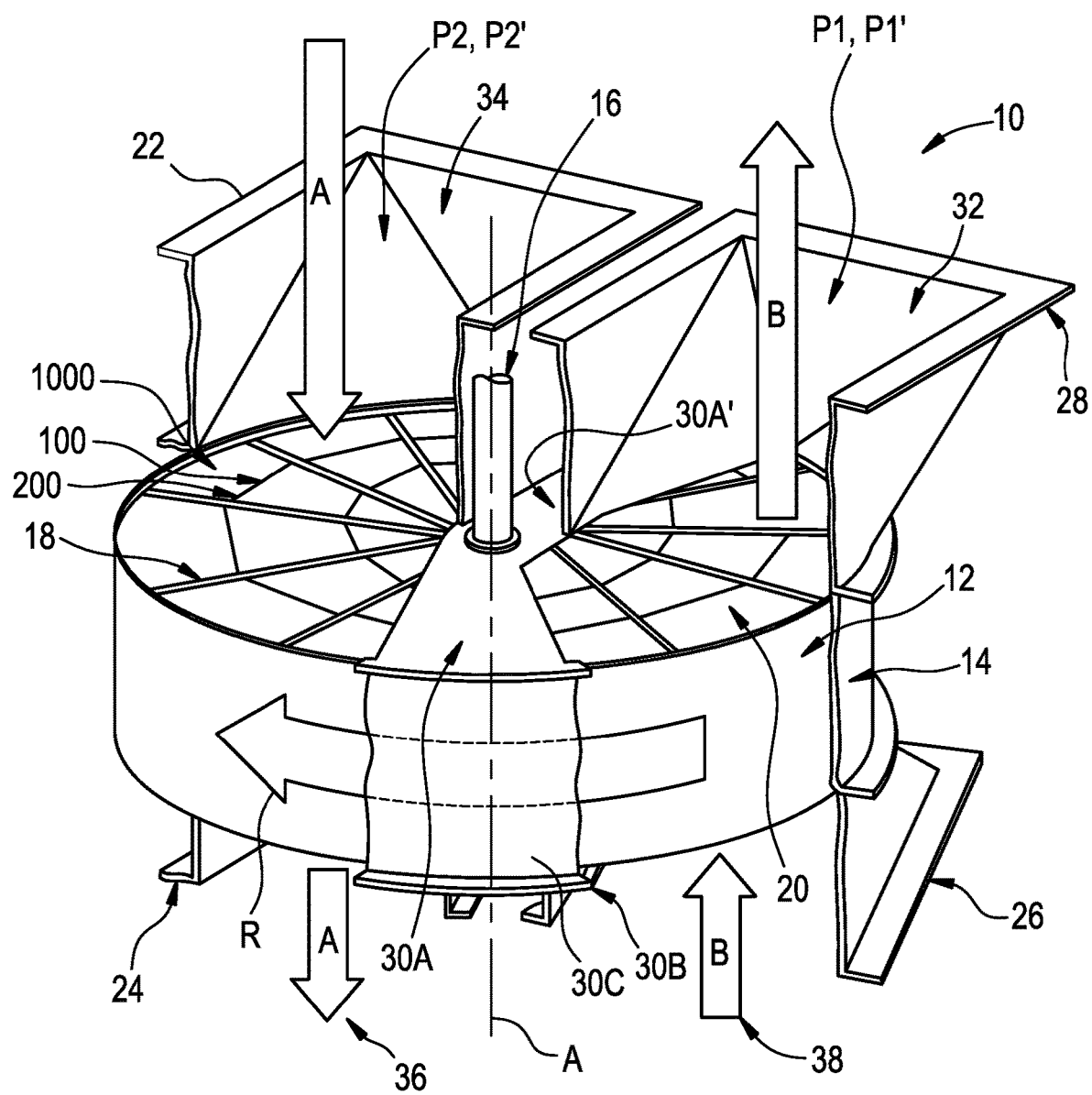
FIG. 1 is a perspective view of a preheater shown in a partial cut away view.

Referring to FIG. 6, when the distal end 52D of the seal assembly 140 engages the surface 31 of the sector plate 30A' a pressure P1 (shown on a left hand side of the leaf assembly 50 in FIG. 6) is present in the air outlet duct 28 of the air sector 32 of FIG. 1; and a pressure P2 (shown on a right hand side of the leaf assembly in FIG. 6) is present in the flue gas inlet duct 22 of the gas sector 34 of FIG. 1. The pressure P1 is greater than the pressure P2, thereby creating a pressure differential ΔP across the seal assembly 140. When the seal assembly 140 is in the area of the sector plate 30A', without the displacement members 70 properly set, the differential pressure ΔP causes the leaf assembly 50 to deflect in the direction indicated by the arrow XX tending to open up a leakage gap between the distal end 52D of the seal assembly 140 and the surface 31 of the sector plate 30A'. However, the displacement members 70 apply a preload or predetermined deflection to the leaf assembly 50 so that the leaf assembly remains in a generally upright position with the distal end 52D of the seal assembly 140 engaging the surface 31 of the sector plate 30A' and thereby overcoming the differential pressure ΔP induced deflection.

When the seal assembly rotates about 180 degrees into the area of the sector plate 30A a pressure P1' (shown on a right hand side of the leaf assembly 50 in FIG. 6) is present in the air outlet duct 28 of the air sector 32 of FIG. 1; and a pressure P2' (shown on a left hand side of the leaf assembly in FIG. 6) is present in the flue gas inlet duct 22 of the gas sector 34 of FIG. 1. The pressure P1' is greater than the pressure P2' thereby creating a differential pressure ΔP' across the leaf assembly 50. When the seal assembly 140 is in the area of the sector plate 30A the differential pressure ΔP' tends to cause the leaf assembly 50 to deflect in the direction indicated by the arrow YY. When the seal assembly 140 is in the area of the sector plate 30A the displacement members 70 hold the leaf assembly 50 in a predetermined position in which the distal end 52D of the seal assembly 140 engages the surface 31 of the sector plate 30A to minimize leakage between the air sector 32 and the gas sector 34.

As shown in FIGS. 3 and 6, each of the seal assemblies 140 include a strip 80 having a fourth base section 80B that engages the second base section 54B of the second leaf 54. The fourth base section 80B defines a fourth fastening area, for example, a flat section and a bore extending therethrough for receiving one of the bolts 145 for securing each of the strips 80 to the diaphragm 18 of the preheater 10 of FIG. 1. The second base section 54B is positioned between the first base section 52B and the fourth base section 80B. The strip 80 defines a deflector section 80L extending away from the fourth base section 80B and away from the second leaf 54. The deflector section 80L terminates at a distal end 80D. For example, the strip 80 has a bend 80Y so that the deflector section 80L is set at an angle Q away from the second leaf 54. The strip 80 has utility in protecting the leaf assembly 50 from potential obstructions such as soot blowing equipment projecting into the preheater 10. In addition, the strip 80 is a limit stop for limiting the amount of deflection of the leaf assembly 50.

As shown in FIGS. 4 and 6 each of the seal assemblies 140 has a bar 90 (e.g., a spacer bar, or elongate washer) that is aligned with a portion of the first base section 52B and the second base section 54B. The bar 90 extends along a length of the leaf assembly 50 and is positioned between the nuts 146 and the diaphragm 18. The bar 90 provides structural stability and helps uniformly secure the first leaf 52, second leaf 54 and the strip 80 to the diaphragm 18.

As shown in FIG. 6, the sector plate 31 defines a sharp leading edge 31L and a sharp trailing edge 31T. The leading edge 31L is defined by an angle Ø1; and the trailing edge 31T is defined by an angle Ø2. In one embodiment, the angle Ø1 and/or the angle Ø2 is about 90 degrees.

Through analysis and experimentation, the inventors have surprisingly discovered that as the seal assembly 50 rotates with the rotor assembly 12, the first distal end 52D of the first leaf 52 abruptly and scrapingly engages the leading edge 31L in a scissor-like operation; and abruptly and scrapingly disengages the trailing edge 31T in the scissor-like operation, which causes premature wear of the seal. Contrary to engineering intuition, the inventors have found that the wear is more prominent radially inward towards the rotor post 16.

Figure 7:
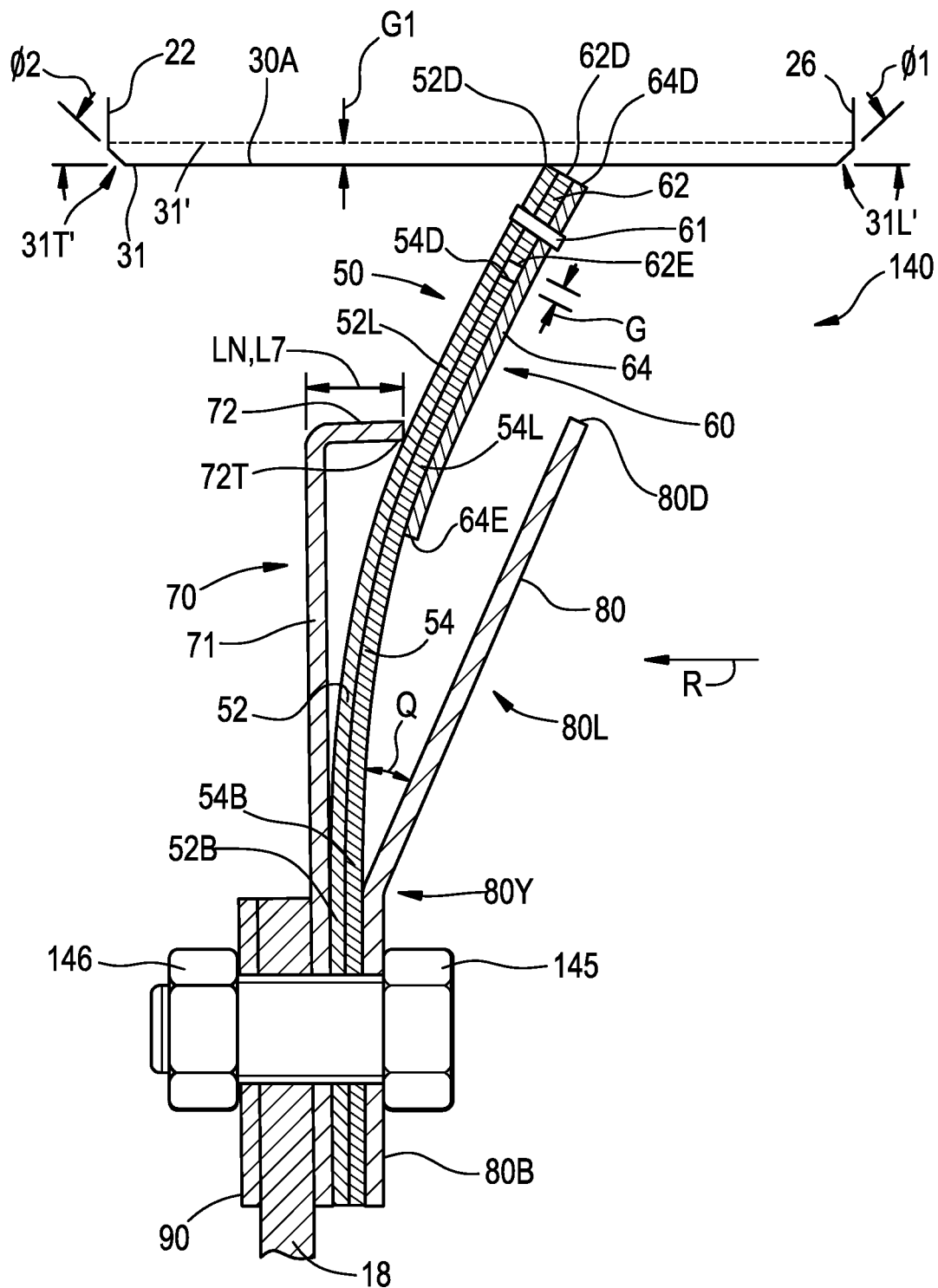
FIG. 7 is another embodiment of the seal assembly of FIG. 6 shown with a sector plate having a ramped configuration.
Figure 8:
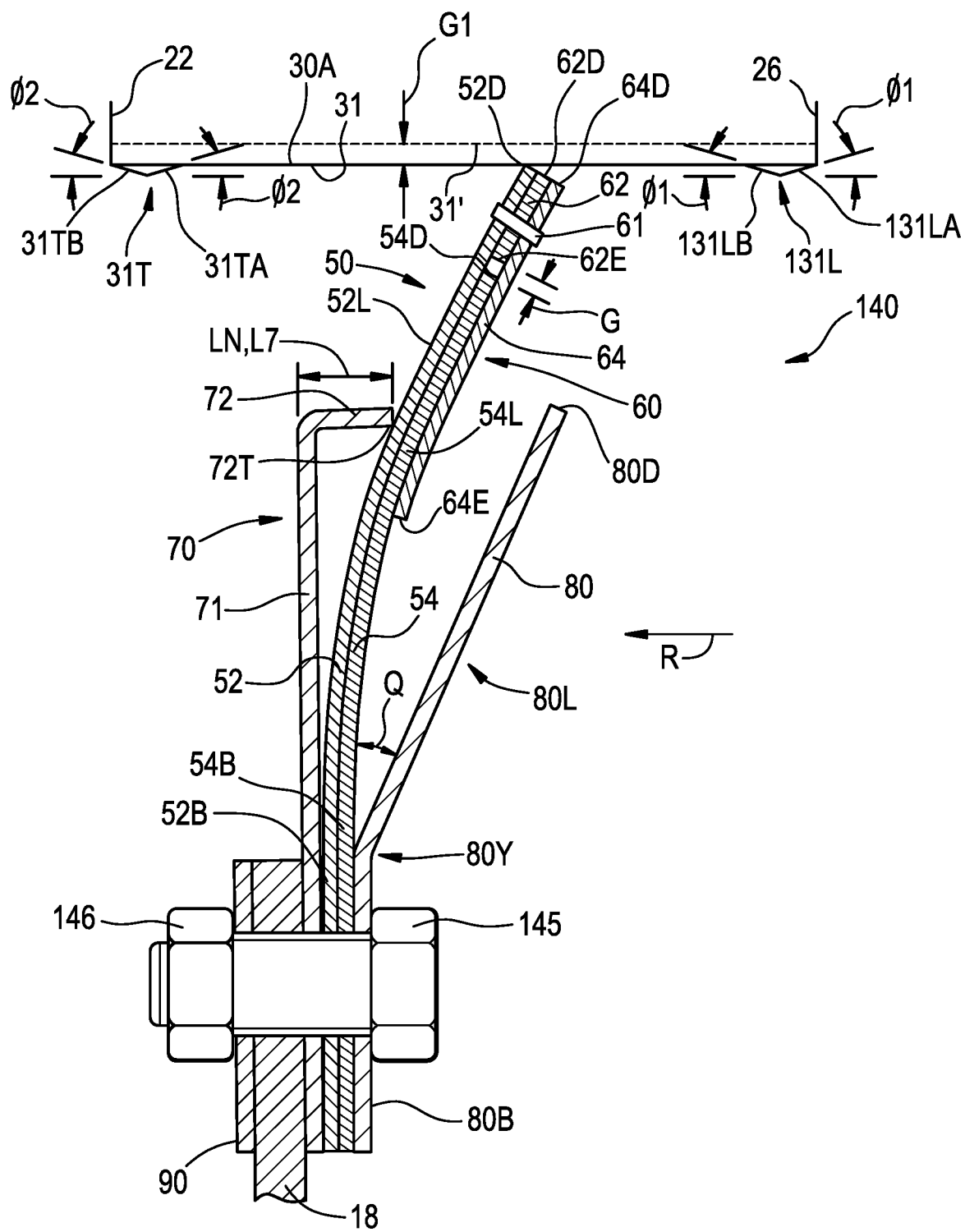
FIG. 8 is another embodiment of the seal assembly of FIG. 7 wherein the ramped configuration includes a ramp attachment secured to each of the leading and trailing edges of the sector plates.

As prompted by the results of the experimentation and testing, the inventors have modified the sharp leading edge 31L and trailing edge 31T to a ramped configuration as shown in FIG. 7. The ramped configuration includes a ramped leading edge 31L' and a ramped trailing edge 31T'. The ramped leading edge 31L' defines a ramp angle Ø1, and the ramped trailing edge defines a ramp angle θ2. In one embodiment the ramp angles θ1 and/or θ2 are between about 15 and 25 degrees relative to the surface 31 of the sector plate 30A or 30B. In one embodiment the ramp angles θ1 and/or θ2 are between about 25 and 45 degrees relative to the surface 31 of the sector plate 30A or 30B. While the ramped leading edge 31L' and the ramped trailing edge 31T' is shown as a chamfer in the sector plate 30A the present disclosure is not limited in this regard as similar configurations may be employed in the sector plate 30B (or other sector plates in tri-sector and quad sector preheaters) and/or other ramp configurations may be employed such as but not limited to ramp attachments 131L and 131T secured to the sector plate 30A and/or 30B as shown in FIG. 8. As shown in FIG. 8, the ramp attachment 131L has a leading surface 131LA and a trailing surface 131LB each oriented at a ramp angle θ1 relative to the surface 31 of the sector plate 30A. Likewise, the ramp attachment 131T has a leading surface 131TA and a trailing surface 131TB each oriented at a ramp angle θ2 relative to the surface 31 of the sector plate 30A. The ramp attachments 131L and 131T are secured to the sector plates 30A and/or 30B by a suitable fastening configuration such as but not limited to bolting and welding. The ramp attachments 131L and 131T are configured to be installed as original equipment as part of a new preheater installation or retrofitting of an existing preheater.

As a result of laboratory test simulations of preheater operation, the inventors have found that the ramped configuration having a 20 degree ramp angle results in a total wear rate of the seal assembly 50 of less than 0.0016 inches per hour at less than 30 percent load operation at locations along the seal assembly between 50 and 150 inches from the axis A; and less than $4 \times 10^{-4}$ inches per hour at less than 30 percent load operation at locations along the seal assembly radially outward of 150 inches from the axis A. While the wear rates are based upon laboratory testing, the inventors expect that they are a reasonable prediction of wear during operation.

Figure 13:
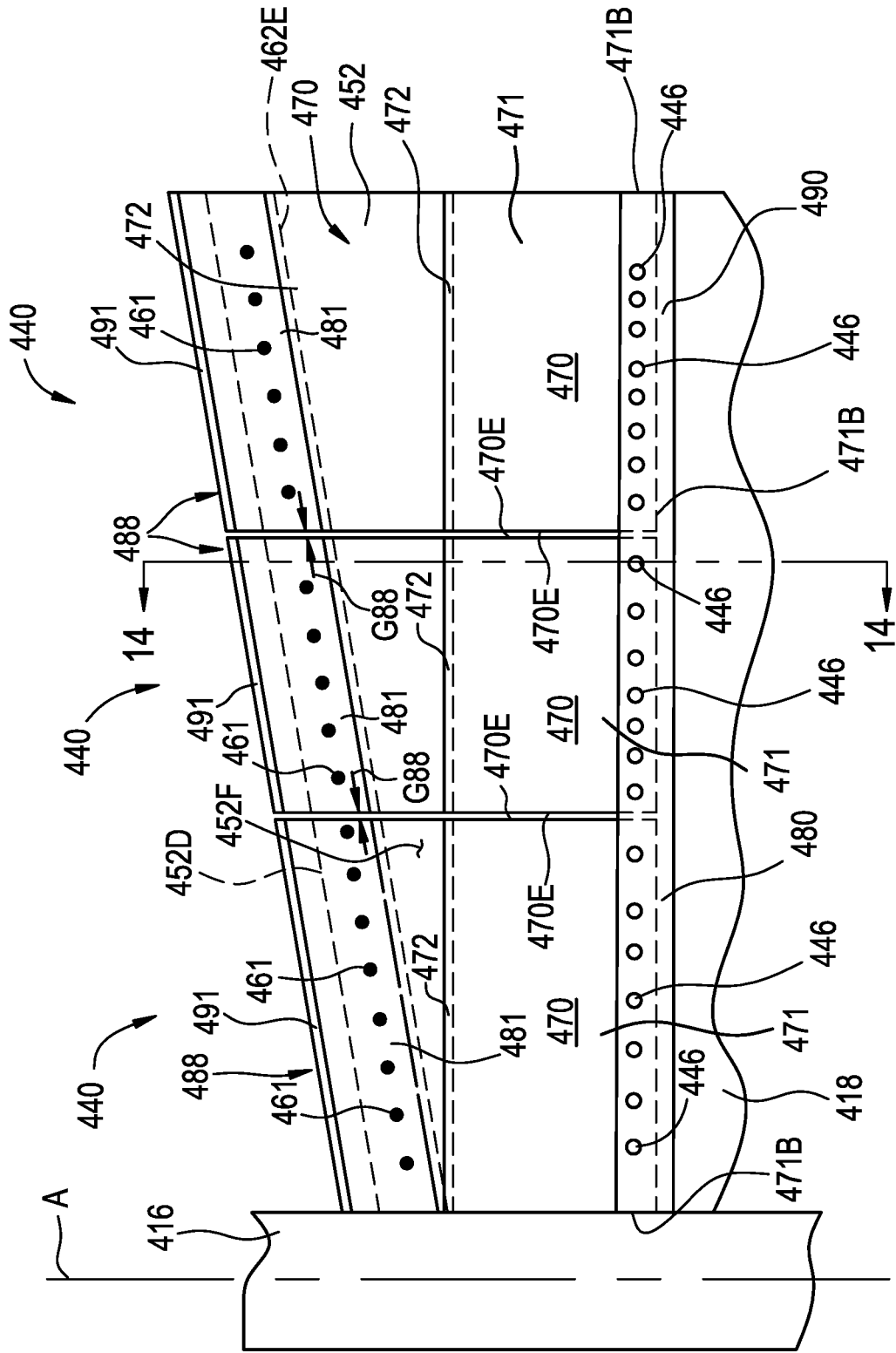
FIG. 13 is a plan view of a seal assembly with a wear tip and wear coating, viewed from a leading side of the diaphragm.
Figure 14:
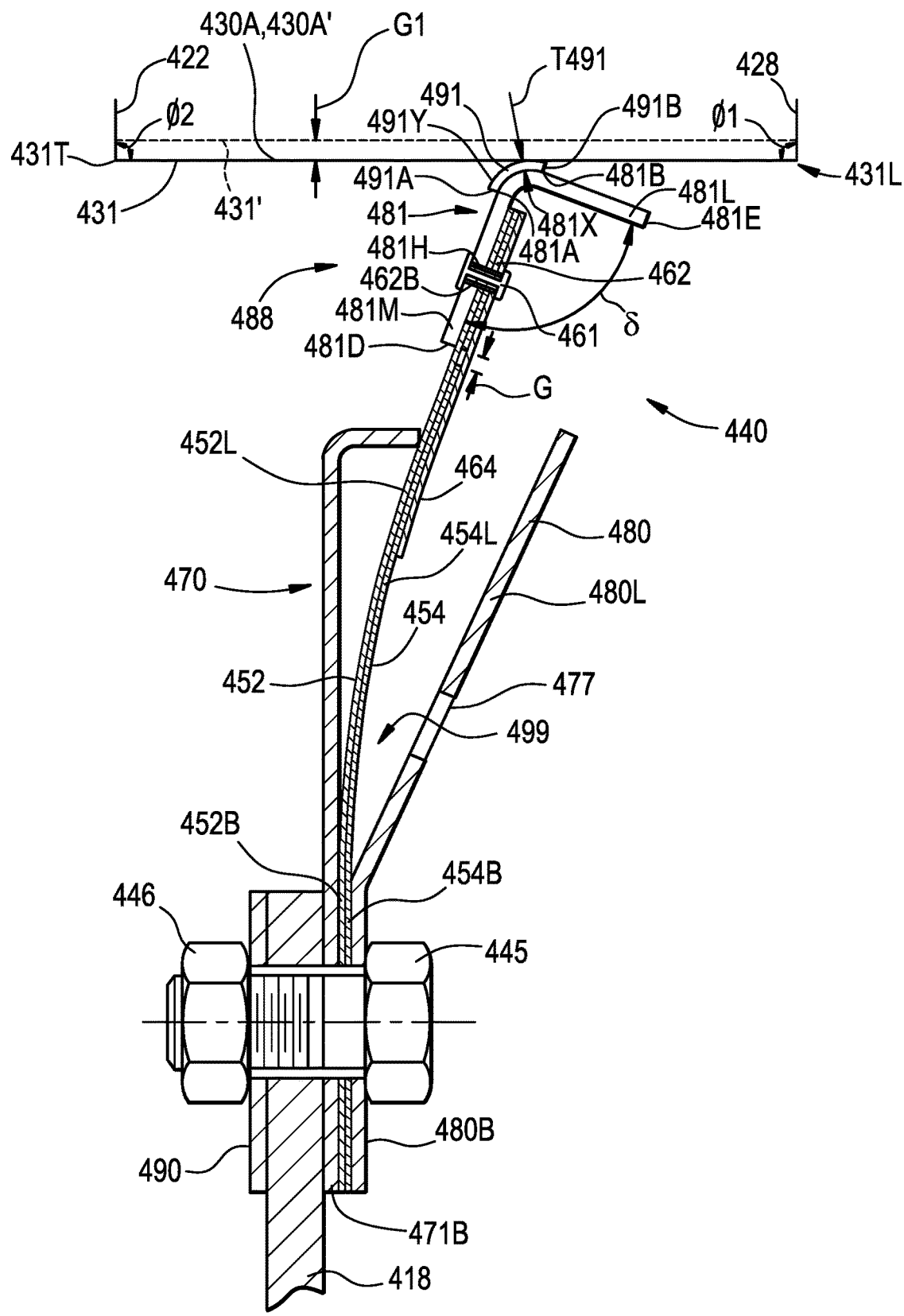
FIG. 14 is a cross sectional view of the seal assembly of FIG. 13 taken across line 14-14 of FIG. 13.

Referring to FIGS. 13 and 14, a seal 440 is similar to the seal 140 of FIGS. 3-8, thus similar elements are designated with similar reference numbers preceded by the number 4. Each of the seal assemblies 440 includes a plurality of wear resistant members 488 secured to the first leaf 452 and the supplemental leaf assembly 460 via suitable fastening structures 461 such as rivets or spot welds. While each of the plurality of wear resistant members 488 are shown and described as being secured to the first leaf 452 and the supplemental leaf assembly 460, the present disclosure is not limited in this regard as the each of the plurality of wear resistant members 488 may be secured directly to the first leaf 452, with the first leaf 452 independently being secured to a portion of the supplemental leaf assembly 460. Adjacent seal assemblies 440 including the wear resistant members 488 are spaced apart from one another (e.g., radially segmented) by a gap G88 to allow the seal assemblies 440 to bend. For example, three seal assemblies 440 are shown adjacent to one another and spaced apart by the gap G88. However, the present disclosure is not limited in this regard as any number of seal assemblies 440 may be employed and spaced apart from one another by the gaps G88. The supplemental leaf assembly 460 is secured to the first leaf 452 by the fastening structures 461 and slidingly engages the second leaf 454. The supplemental leaf assembly 460 includes a spacer 462 (e.g., a spacer leaf) secured to (e.g., via the fastening structures 461) the first leaf 452. The spacer 462 defines a distal end 462D. The supplemental leaf assembly 460 includes a third leaf 464 secured to (e.g., via the fastening structures 461) the spacer 462. The third leaf 464 slidingly engages a portion of the second leaf 454. The third leaf 464 defines a third distal end 464D. The spacer 462 is positioned between the first leaf 452 and the third leaf 464. The spacer 462 is spaced apart from the second distal end 454D thereby defining a gap G between the spacer 462 and the second distal end 454D to accommodate movement of the spacer 462 relative to the second distal end 454D.

As shown in FIGS. 13 and 14, the wear resistant member 488 is defined by a plurality of elongate strips 481 (e.g., ten wear resistant members 488 shown by way of example). Each of the elongate strips 481 has an angled cross section, such as, but not limited to an L-shaped cross section. While the elongate strip 481 is shown and described as having an angled cross section such as an L-shaped cross section, other cross sections may be employed including but not limited to arcuate and J-shaped cross sections. As shown in FIG. 13, the plurality of elongate strips 481 collectively extend an entire length of the seal 440.

As best shown in FIG. 14, the elongate strip 481 has a mounting leg 481M, a bend 481X extending from the mounting leg 481M and a terminal leg 481L extending from the bend 481X. The mounting leg 481M has a plurality of holes 481H extending therethrough. One of the fastening structures 461 extends through each of the holes 481. A spacer sleeve 462B is positioned in each of the holes 461H and around the fastening structure 461 to limit compression between the first leaf 452 and the supplemental leaf assembly 460. The bend 481X extends from the mounting leg 481M at an angle δ (e.g., shown as a 90 degree angle). The bend 481X extends a length from point 481A to point 481B. While an angle of 90 degrees is shown and described, the present disclosure is not limited in this regard as other angles may be employed including but not limited to angles less than 90 degrees (e.g., 89-85 degrees, 89-80 degrees, 89-70 degrees, 89 to 45 degrees or smaller angles) or angles greater than 90 degrees (e.g., 91-95 degrees, 91-100 degrees, 91-110 degrees, 91-120 degrees of greater angles). In one embodiment the elongate strip 481 is manufactured from a steel alloy.

As best shown in FIG. 14, a wear resistant material 491 is applied to the bend 481X. The wear resistant material 491 extends from a first end 491A to a second end 491B thereof along the bend 481X. The bend 481X provides ample surface area for applying an optimum amount of the wear resistant material to achieve adequate bonding and minimize the cost by not applying the wear resistant material to the entire elongate strip 481. In one embodiment, the wear resistant material 491 is a powder coating such as those supplied by Aegis Industrial Finishing Ltd. of Surrey, Canada. In one embodiment, the wear resistant material 491 is hardfacing weldment such as a cobalt based weld alloy (e.g., Stellite®, a registered trademark of Kennametal, Inc. of Latrobe Pa.). In one embodiment, the wear resistant material 491 is a replaceable wear resistant strip adhered to the bend 481X. In one embodiment, the wear resistant material 491 is a composite structure with multiple layers including a fabric layer impregnated with wear resistant particles. In one embodiment, the wear resistant material 491 is a case hardened area, such as via nitriding or carburizing.

As shown in FIG. 14, a portion of an outer surface 491Y of the wear resistant material 491 of each wear resistant element 488 slidingly engages the surface 31 of the sector plate 30A during reduced (e.g., 30 percent load or less) or zero load operation. A portion of an outer surface 491Y of the wear resistant material 491 of each wear resistant element 488 of another seal assembly 440, positioned on an opposite side of the diaphragm 418, slidingly engages the surface 31 of the sector plate 30B. For loads greater than 30 percent the outer surface 491Y of the wear resistant material 491 of each wear resistant element 488 is spaced apart from the surface 31' of the sector plate 30A by a gap G1 that reduces hot end radial seal gap by fifty percent at full load compared to the prior art seal assemblies 40.

Figure 2:
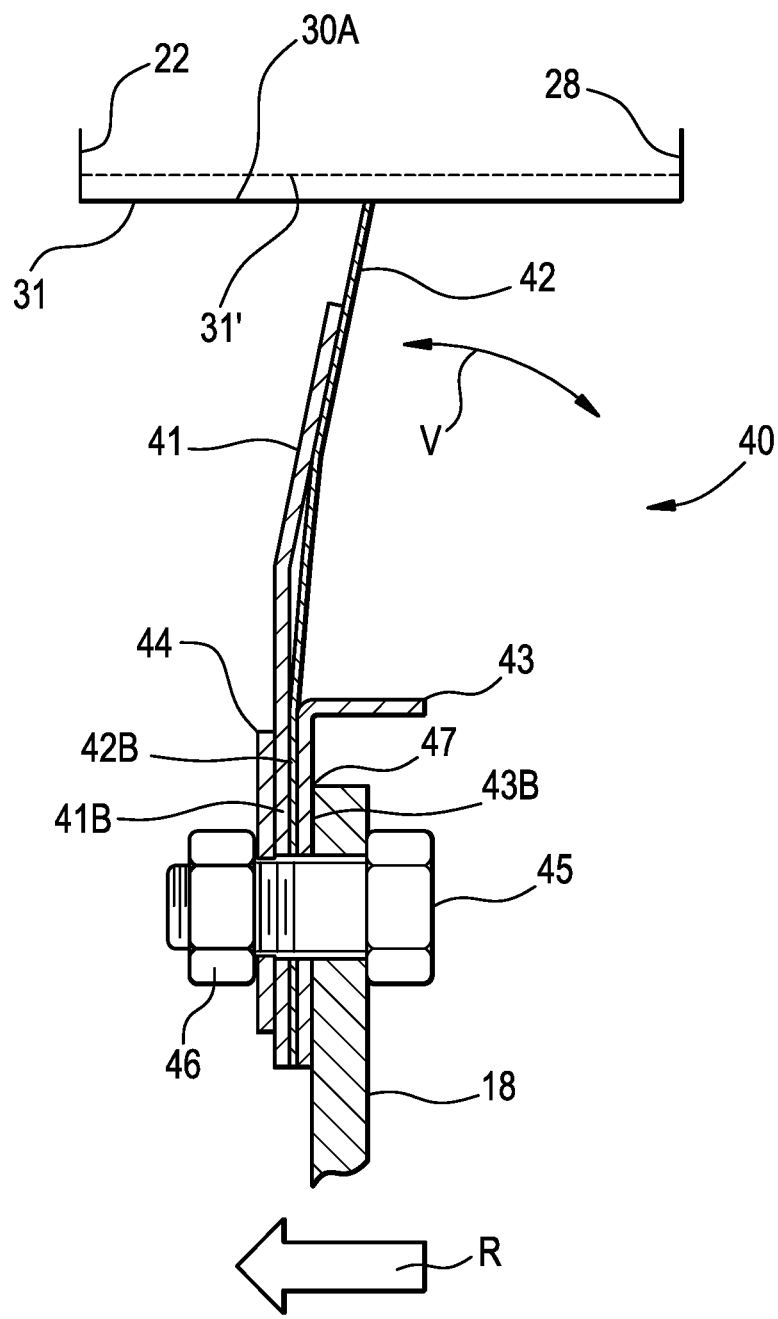
FIG. 2 is a cross sectional view of a prior art seal secured to a diaphragm of a preheater.
Figure 15:
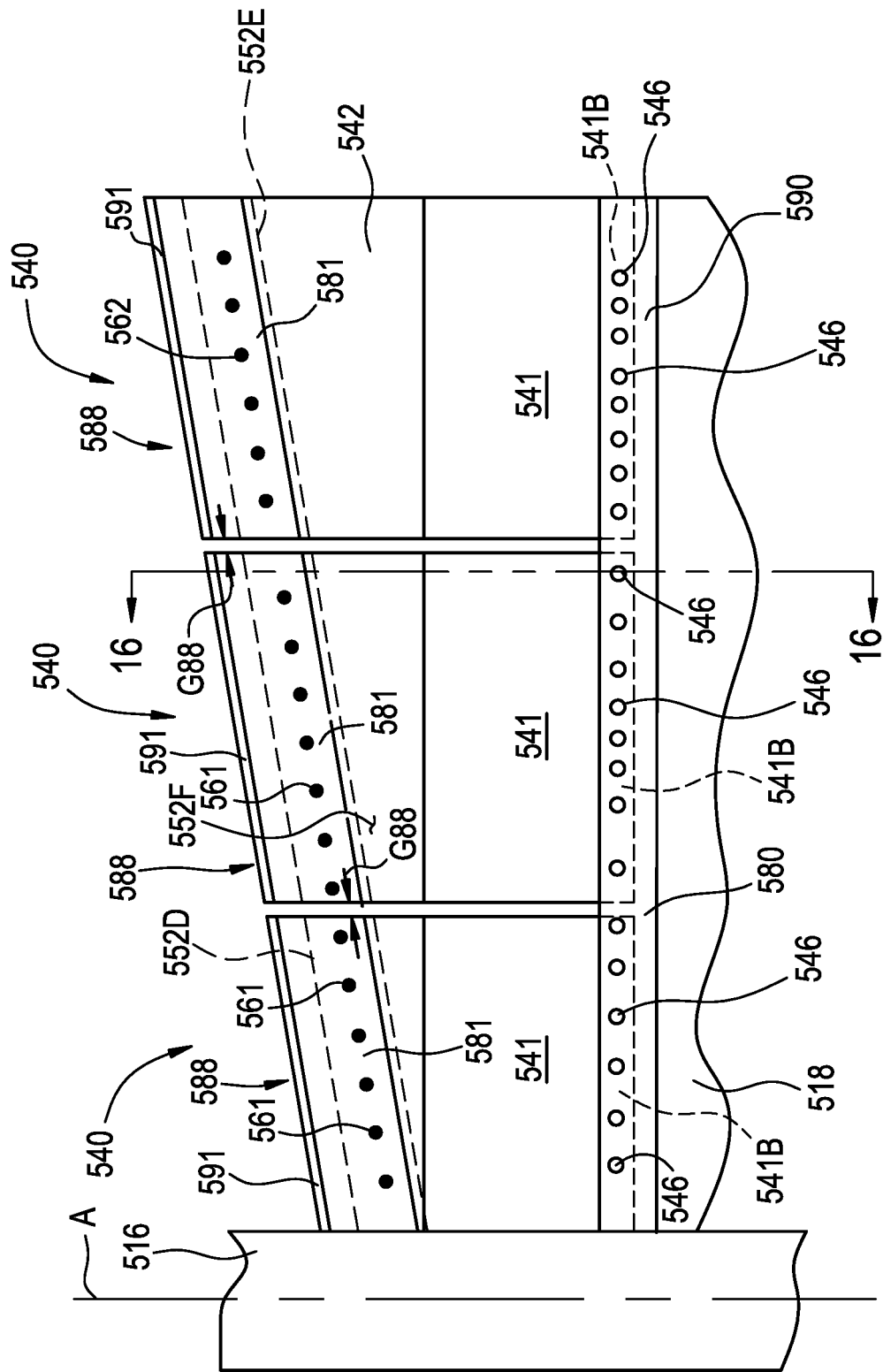
FIG. 15 is a plan view of another embodiment of a seal assembly with a wear tip and wear coating, viewed from a leading side of the diaphragm.
Figure 16:
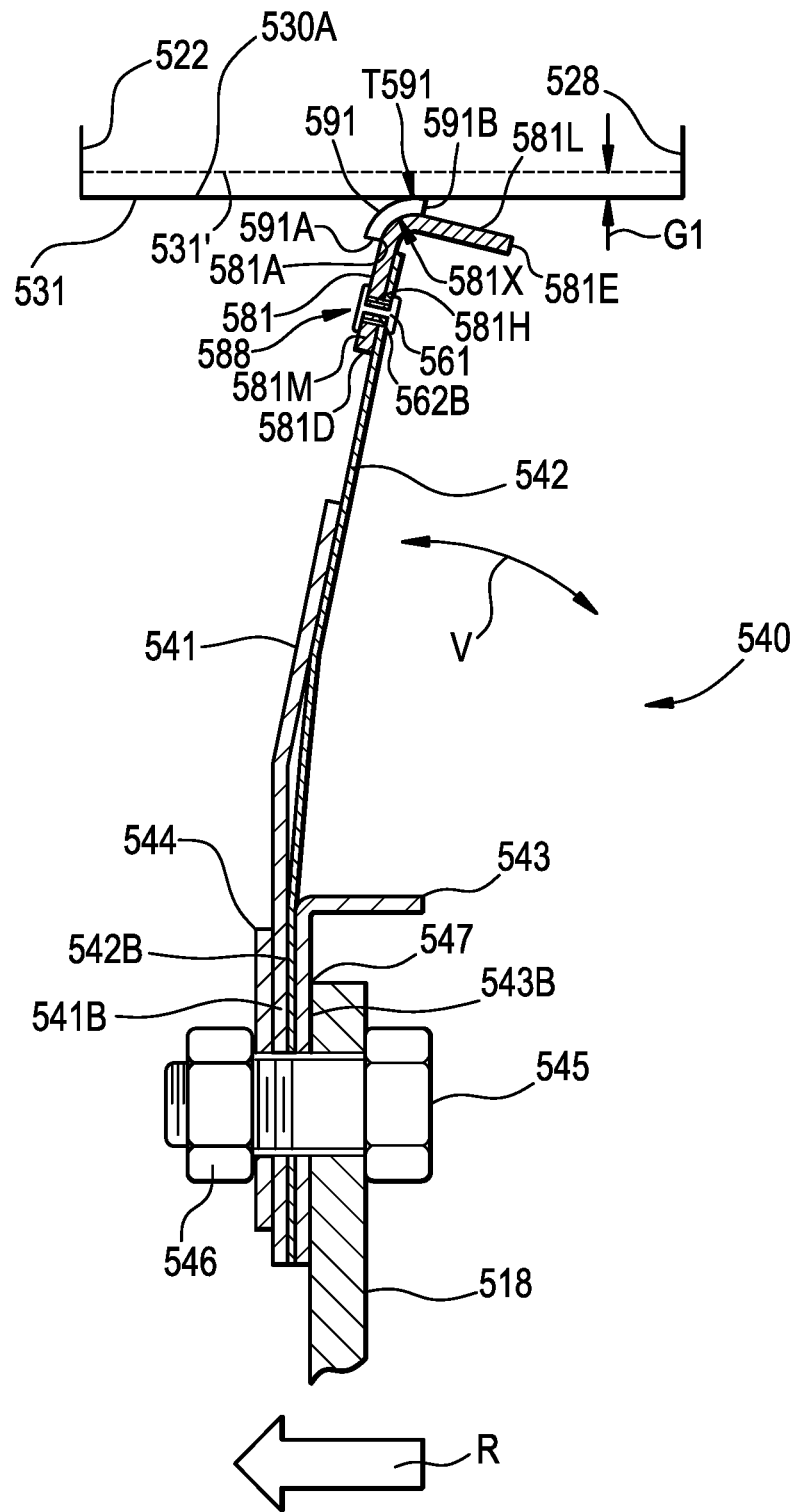
FIG. 16 is a cross sectional view of the seal assembly of FIG. 15 taken across line 16-16 of FIG. 15.

As shown in FIGS. 15 and 16, the three seal assemblies 540 are similar to the seal assemblies 40 shown in FIG. 2 but with the addition of a wear resistant member 588, as described herein. Thus, similar elements are designated with similar reference numbers preceded by the number 5. The seal assemblies 540 extends axially from (i.e., parallel to the axis A) and radially along an edge of each of the diaphragms 518 towards the sector plate 530A in a radially segmented configuration so that each adjacent pair of the seal assemblies 540 are spaced apart from one another by the gap G88. Another set of three seal assemblies 540 extend axially from and radially along an opposite side of each of the diaphragms 518 towards the sector plate 530B (only one seal 540 shown in FIG. 1). The seal 540 includes a flexible seal leaf 542 having a base portion 542B that is positioned between an L-shaped backing bar 543 and an elongate holding bar 541. For each of the seal assemblies 540, a base portion 541B of the holding bar 541, the base portion 542B of the flexible seal 542 and a base portion 543B of the backing bar 543 are secured by a plurality of bolts 545 and nuts 546 between a spacer bar 544 and the diaphragm 518, radially along a length of the diaphragm 518.

As shown in FIGS. 15 and 16, the flexible seal leaf 542 has a plurality of holes 542H extending therethrough. A plurality of wear resistant members 588 are secured to the flexible seal leaf 542 via suitable fastening structures 461 such as rivets or spot welds that extend through the holes 542H. Adjacent wear resistant members 588 are spaced apart from one another by a gap G88 to allow the seal 540 to bend. Each of the wear resistant members 588 are configured and manufactured similar to the wear resistant members 488 described herein.

As shown in FIG. 15, the a portion of an outer surface 591Y of the wear resistant material 591 of each wear resistant element 588 slidingly engages the surface 31 of the sector plate 30A during reduced (e.g., 30 percent load or less) or zero load operation. A portion of an outer surface 591Y of the wear resistant material 591 of each wear resistant element 588 of another seal assembly 540, positioned on an opposite side of the diaphragm 518, slidingly engages the surface 31 of the sector plate 30B. For loads greater than 30 percent the outer surface 591Y of the wear resistant material 591 of each wear resistant element 588 is spaced apart from the surface 31' of the sector plate 30A by a gap G1.

Figure 17:
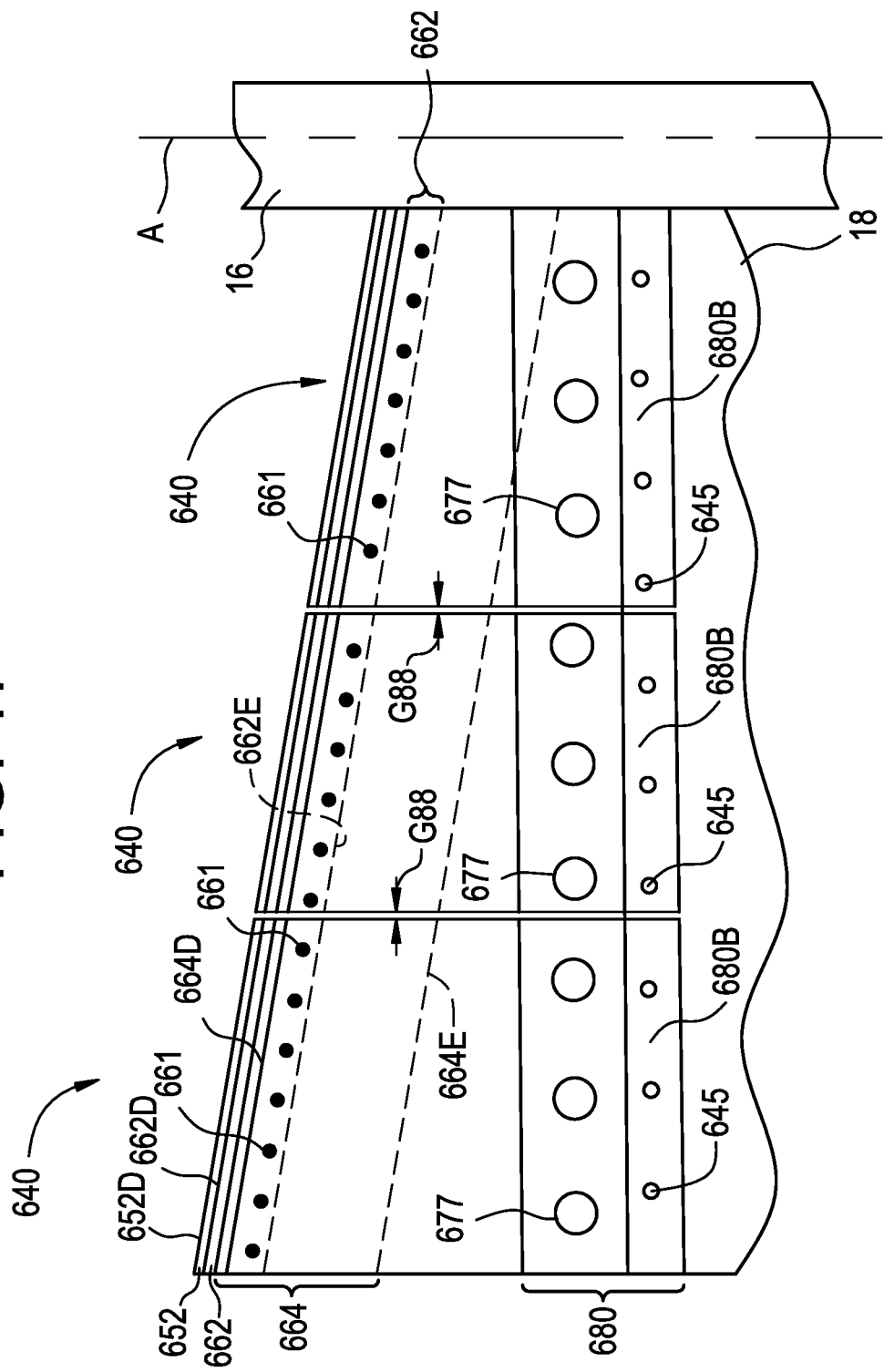
FIG. 17 is a plan view of the seal assembly of the present invention viewed from a trailing side of the diaphragm.
Figure 18:
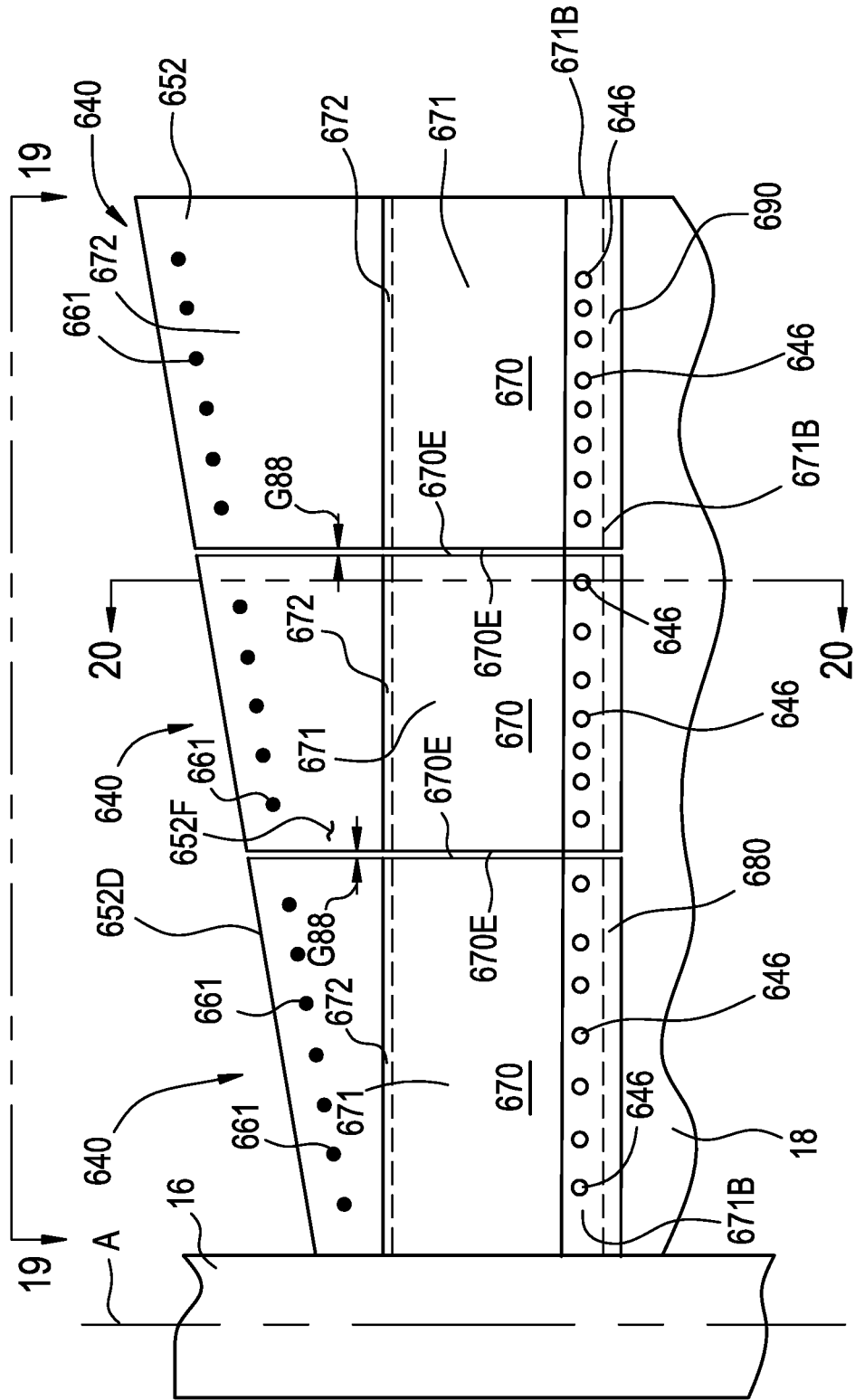
FIG. 18 is a plan view of the seal assembly of FIG. 17, viewed from a leading side of the diaphragm.
Figure 19:
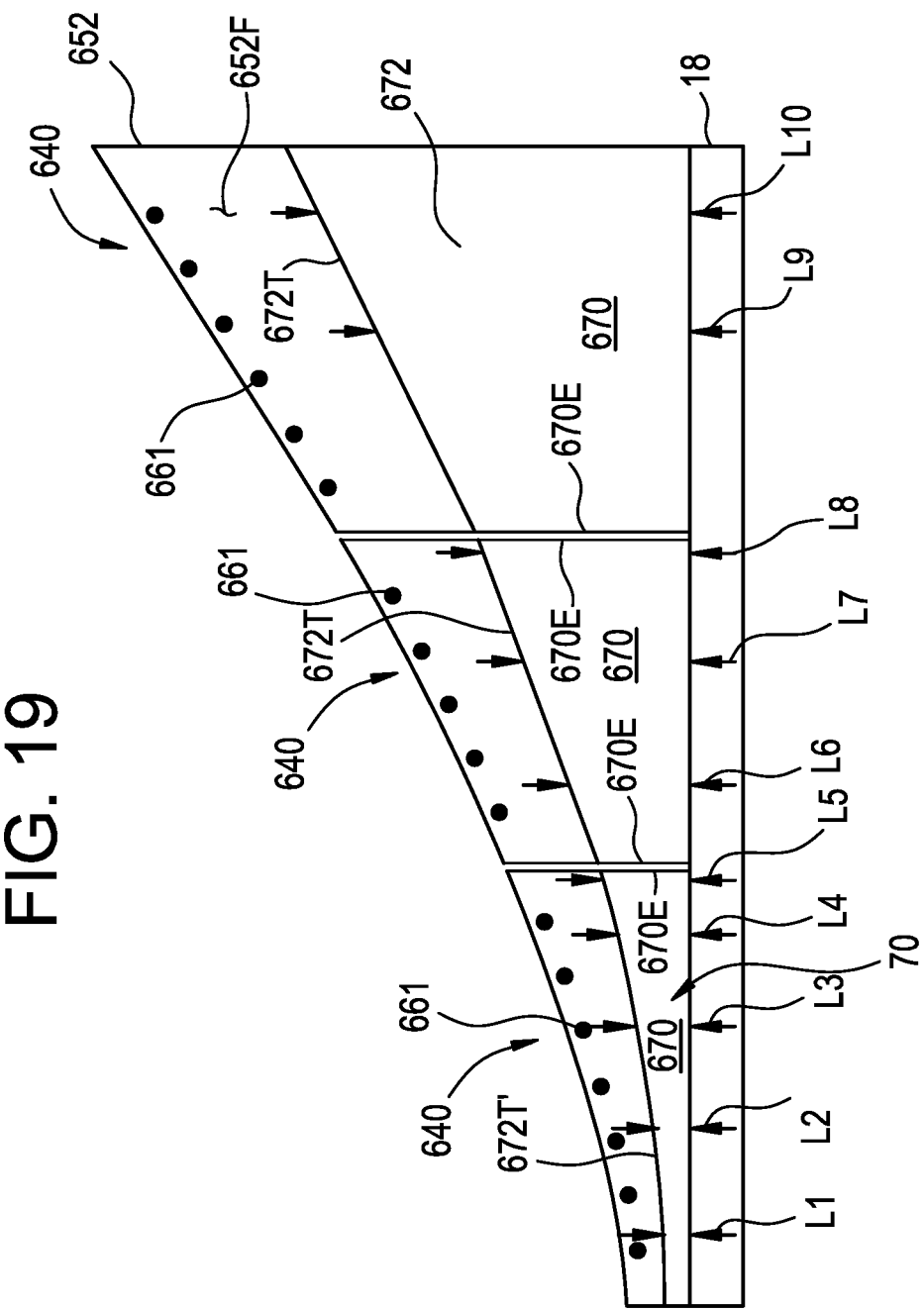
FIG. 19 is a top view of the seal assembly of FIG. 4 taken across line 19-19 of FIG. 18.
Figure 20:
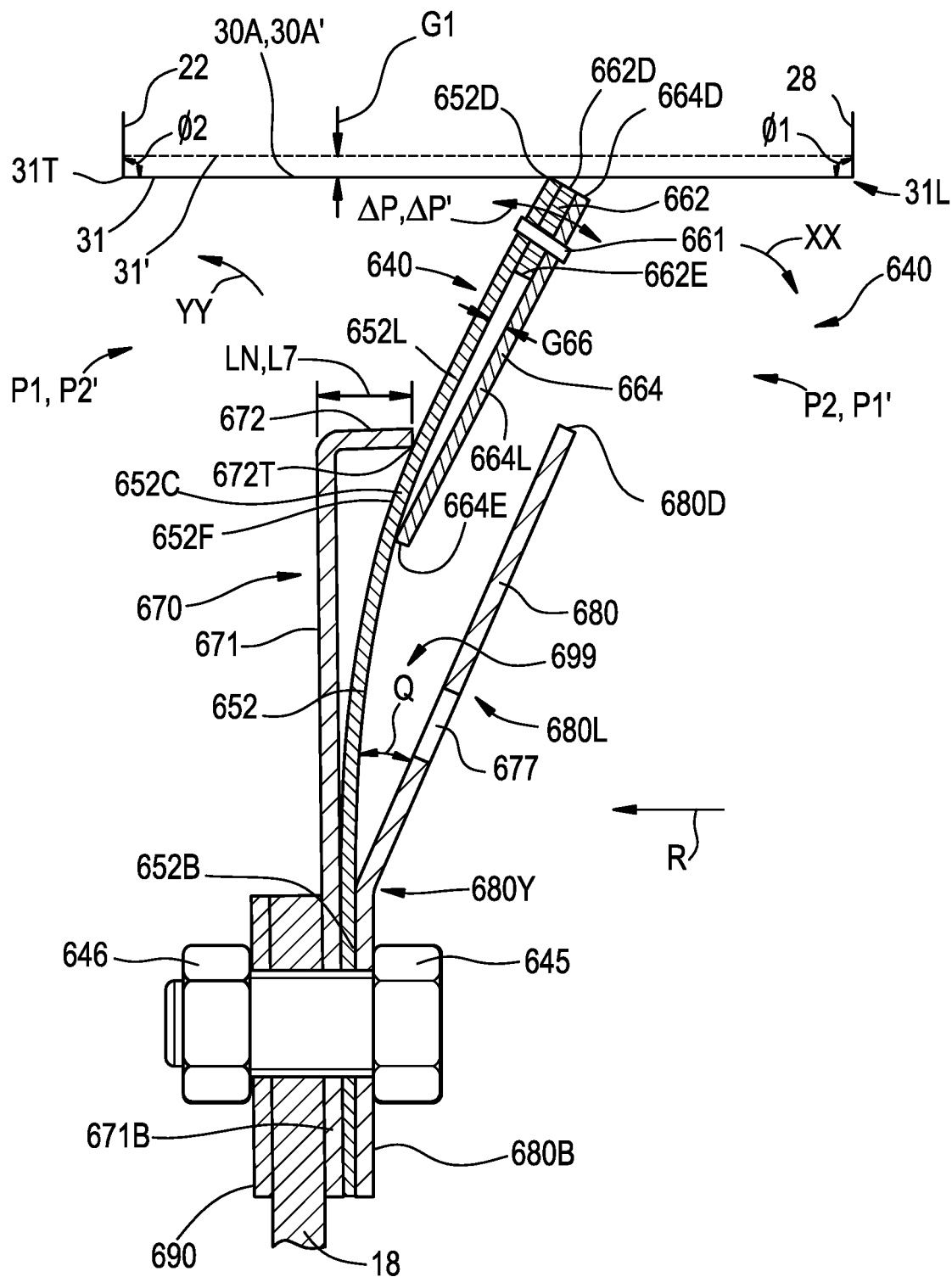
FIG. 20 is a cross sectional view of the seal assembly of FIG. 18 taken across line 20-20 of FIG. 18.

As shown in FIG. 20, a seal assembly of the present invention is generally designated by the numeral 640 which incorporates improvements compared to the seal assembly 140 of FIG. 6, as described herein. As shown in FIGS. 17-19 three of the seal assemblies 640 are secured, in a radially segmented configuration, to opposing axially edges of each of the diaphragms 18 of the bisector type preheater of FIG. 1 by a suitable fastener system such as a plurality of bolts 645 and nuts 646. However, other methods of fastening the seal assemblies 640 to the diaphragms 18 may be employed such as but not limited to welding and brazing. Each of the seal assemblies 640 are a generally elongate member that extends between the rotor post 16 and a radially outward peripheral edge of the diaphragm 18, as shown in FIGS. 17 and 18. While the seal assembly 640 is described as being employed in a bisector type preheater, the present invention is not limited in this regard as the seal assembly may be employed in a tri-sector or quad sector preheater, without departing from the broader aspects disclosed herein.

Referring to FIG. 20, each of the seal assemblies 640 includes a first leaf 652 having a first base section 652B. The first base section 652B defines a first fastening area, for example, a flat section and a bore extending therethrough for receiving one of the bolts 645 for securing the first leaf 652 to the diaphragm 18 of the preheater 10 of FIG. 1 or other suitable mounting bracket such as the mounting bracket 695 illustrated in FIG. 24. The first leaf 652 has a first elongate section 652L (e.g., a substantially straight section) extending away from the first base section 652B and terminating at a first distal end 652D thereof. The first leaf 652 has a first bend 652C located between the first base section 652B and the first elongate section 652L.

Referring to FIG. 20, each of the seal assemblies 640 includes a spacer 662 (e.g., a leaf, segment of a leaf, or washer) secured to the first leaf 652 proximate (e.g., close to or near) the distal end 652D of the first leaf 652. The spacer 662 extends along the first leaf 652 from an outboard or distal end 662D of the spacer 662 to and terminating at an inboard end 662E of the spacer 662. The inboard end 662E is positioned along the first elongate section 652L of the first leaf 652.

While the spacer 662 is described and shown in FIG. 20 as being a leaf, segment of a leaf or washer, the present invention is not limited in this regard as other spacer configurations may be employed including but not limited to: 1) a spacer 162L formed as a leg as a result of a bend 152D in the first leaf 152 as shown in FIG. 10; 2) a spacer ring 262B disposed around a rivet 261 and positioned between the first leaf 252 and a third leaf 264 as shown in FIG. 11; and 3) a spacer 362L formed as a leg as a result of a bend 364D in the third leaf 364 as shown in FIG. 12.

Referring to FIG. 20, each of the seal assemblies 640 includes a second leaf 664 having a second distal end 664D. The second leaf 664 is secured to the spacer 662 so that the distal end 664D is positioned proximate (e.g., close to or near) the outboard or distal end 662D of the spacer 662. The second leaf 664 has a second elongate section 664L (e.g., substantially straight) that extends away from the second distal end 664D towards the first base section 652B of the first leaf 652. The second elongate section 664L extends beyond the inboard end 662E of the spacer 662 and terminates along the first bend 652C of the first leaf 652 at a terminus 664E (e.g., distal end) of the second leaf 664 so that a portion of the second leaf 664 (e.g., a corner, edge or exterior surface portion of the second leaf) proximate the terminus 664E slidingly engages (e.g., is slidingly moveable relative to and in compressive engagement with) a portion of the first bend 652C. A portion of the second elongate section 664L is spaced apart from the first elongate section 652L, forming a gap G66. In one embodiment, the second leaf 664 is substantially straight or linear in cross section between the second distal end 664D and the terminus 664E.

As shown in FIG. 20, in one embodiment the distal ends 652D, 662D and 664D are aligned with one another. In the configuration shown in FIG. 20, the distal end 652D of the first leaf 652 is shown slidingly engaging the surface 31 of the sector plate 30A during reduced (e.g., 30 percent load or less) or zero load operation. Another of the distal ends 652D of the first leaf 652, positioned on an opposite side of the diaphragm 18, slidingly engages the surface 31 of the sector plate 30B. For loads greater than 30 percent, the distal end 652D is spaced apart from the surface 31' of the sector plate 30A by a gap G1 that reduces hot end radial seal gap by fifty percent at full load compared to the prior art seal assemblies 40.

While in FIG. 20 the distal ends 652D, 662D and 664D are aligned with one another, the present invention is not limited in this regard as one or more of the distal ends 652D, 662D and 664D may extend outwardly from one another, as shown in FIG. 9 wherein the distal end 62D extends outwardly from the distal ends 52D and 64D. In one embodiment, portions of the spacer 662 on and adjacent to the distal end 662D are formed of a wear resistant configuration, such as, but not limited to a surface hardfacing weld overlay (e.g., a cobalt based weld material), a case hardened layer (e.g., nitriding, carburizing or other diffusion type hardening) and a precipitation hardened material.

In one embodiment, the first leaf 652, the spacer 662 and/or the second leaf 664 are manufactured from an austenitic stainless steel, for example a 301 stainless steel. In one embodiment the first leaf 652, the spacer 662 and/or the second leaf 664 are about 0.02 to 0.025 inches thick.

As shown in FIGS. 17-19, three of the seal assemblies 640 are shown secured to the diaphragm 18 in a radially segmented configuration and are spaced apart from one another by gaps G88. However, the present invention is not limited in this regard as any number of seal assemblies 640 may be employed and spaced apart from one another by the gaps G88.

As shown in FIG. 18, each of the seal assemblies 640 includes a displacement member 670 (e.g., a holding bar) having side edges 670E that are spaced apart from one another by the gap G88. While three displacement members 670 are shown, the present invention is not limited in this regard as the displacement members 670 may be formed in one integral piece or any number of segments to facilitate installation. In one embodiment illustrated in FIG. 20, each of the plurality of displacement members 670 has an L-shaped configuration defining a first leg 671 and a second leg 672. The first leg 671 defines a second base section 671B. The second base section 671B defines a second fastening area, for example, a flat section and a bore extending therethrough for receiving one of the bolts 645 for securing the displacement member 670' to the diaphragm 618 of the preheater 10 of FIG. 1. While each of the plurality of displacement members 670 is shown and described as having an L-shaped cross section, the present invention is not limited in this regard as the displacement members 670 may employ other configurations such as, but not limited to the bent configuration illustrated in FIG. 24 and described further herein.

As shown in FIG. 19, each of second legs 672 defines an engagement portion 672T configured to engage a surface 652F of the first leaf 652 and to displace a portion of the first leaf 652 a predetermined distance, as described further herein. Each of the engagement portions 672T have a contoured edge configuration. For example, the engagement portion 672T of the two radially outwardly positioned displacement members 670 have a linear tapered edge; and the engagement portion 672T' of the radially inner most positioned displacement member 670 has an arcuate edge that is complementary in shape to the surface 652F of the first leaf 652. However, any of the displacement members 670 may employ an arcuate edge and/or a linear tapered edge.

As shown in FIG. 20 the second leg 672 has a length LN (e.g., L7 shown in FIG. 20, L1-L10 shown in FIG. 19) extending between the first leg 671 and the engagement portion 672T. As shown in FIG. 19 each of L1-L10 are of a different length and displace the first leaf 652 a different magnitude. For example, the lengths L1-L10 progressively increase (i.e., L10 is greater than L9, L9 is greater than L8, L8 is greater than L7, L7 is greater than L6, L6 is greater than L5, L5 is greater than L4, L4 is greater than L3, L3 is greater than L2, L2 is greater than L1). The displacement members 670 are arranged to establish a predefined contour of the leaf assembly 50. The predetermined contour is configured to compensate for movement of the preheater 10 during operation. As shown in FIGS. 17 and 18, the first leaf 652 has a trapezoidal shape.

Referring to FIG. 20, when the distal end 552D of the seal assembly 640 engages the surface 31 of the sector plate 30A' a pressure P1 (shown on a left hand side of the leaf assembly 50 in FIG. 20) is present in the air outlet duct 28 of the air sector 32 of FIG. 1; and a pressure P2 (shown on a right hand side of the leaf assembly in FIG. 20) is present in the flue gas inlet duct 22 of the gas sector 34 of FIG. 1. The pressure P1 is greater than the pressure P2, thereby creating a pressure differential ΔP across the seal assembly 640. When the seal assembly 640 is in the area of the sector plate 30A', without the displacement members 670 properly set, the differential pressure ΔP causes the first leaf 652 to deflect in the direction indicated by the arrow XX tending to open up a leakage gap between the distal end 652D of the seal assembly 640 and the surface 31 of the sector plate 30A'. However, the displacement members 670 apply a preload or predetermined deflection to the first leaf 652 so that the first leaf 652 is in a generally upright position with the distal end 652D of the seal assembly 640 engaging the surface 31 of the sector plate 30A' and thereby overcoming the differential pressure ΔP induced deflection.

When the seal assembly 640 rotates about 180 degrees into the area of the sector plate 30A a pressure P1' (shown on a right hand side of the first leaf 652 in FIG. 20) is present in the air outlet duct 28 of the air sector 32 of FIG. 1; and a pressure P2' (shown on a left hand side of the leaf assembly in FIG. 20) is present in the flue gas inlet duct 22 of the gas sector 34 of FIG. 1. The pressure P1' is greater than the pressure P2' thereby creating a differential pressure ΔP' across the seal assembly 640. When the seal assembly 640 is in the area of the sector plate 30A the differential pressure ΔP' tends to cause the first leaf 652 to deflect in the direction indicated by the arrow YY. When the seal assembly 640 is in the area of the sector plate 30A the displacement members 670 hold the first leaf 652 in a predetermined position in which the distal end 652D of the seal assembly 640 engages the surface 31 of the sector plate 30A to minimize leakage between the air sector 32 and the gas sector 34.

As shown in FIGS. 17 and 20, each of the seal assemblies 640 include a strip 680 (e.g., a backing bar) having third base section 680B that engages the first base section 652B. The first base section 652B is positioned between the second base section 671B and the third base section 680B. The strip 680 defines a deflector section 680L that extends away from the third base section 680B and is spaced apart from the second leaf 664. The third base section 680B defines a third fastening area, for example, a flat section and a bore extending therethrough for receiving one of the bolts 645 for securing each of the strips 680 to the diaphragm 18 of the preheater 10 of FIG. 1. The deflector section 680L terminates at a distal end 680D. For example, the strip 680 has a bend 680Y so that the deflector section 680L is set at an angle Q away from the first leaf 652. The strip 680 has utility in protecting the first leaf 652 from potential obstructions such as soot blowing equipment projecting into the preheater 10. In addition, the strip 680 is a limit stop for limiting the amount of deflection of the first leaf 652. In one embodiment, each of the deflector sections 680L of the strips 680 are a continuous piece without any openings extending therethrough. However, the present invention is not limited in this regard as one or more of the strips 680 may have one or more openings 677 extending therethrough as best described herein with reference to FIGS. 21, 24 and 26.

As shown in FIGS. 18 and 20 each of the seal assemblies 640 has a bar 690 (e.g., a spacer bar, or elongate washer) that is aligned with a portion of the first base section 652B. The bar 690 extends along a length of the seal assembly 640 and is positioned between the nuts 646 and the diaphragm 18. The bar 690 provides structural stability and helps uniformly secure the first leaf 652 and the strip 680 to the diaphragm 18.

As shown in FIG. 20, the sector plate 31 defines a sharp leading edge 31L and a sharp trailing edge 31T. The leading edge 31L is defined by an angle Ø1; and the trailing edge 31T is defined by an angle Ø2. In one embodiment, the angle Ø1 and/or the angle Ø2 is about 90 degrees.

The seal assembly 640' shown in FIGS. 21-26 is similar to the seal assembly 640 shown in FIGS. 17-20, with several exceptions as described herein. The seal assembly 640' incorporated improvements compared to the seal assembly 140 of FIG. 6 and the seal assembly 640 of FIG. 20, as described herein. In one embodiment, each of the seal assemblies 640' shown in FIGS. 21-26 include an extension member 688. The extension member 688 has an L-shaped cross section that includes a first leg 688B secured to the first leaf 652. The extension member 688 extends outwardly from the distal end 652D of the first leaf 652. In one embodiment, the extension member 688 has an outside corner 688C thereon. In one embodiment, the outside corner 688C has a wear resistant material 691 applied thereto. The wear resistant material 691 is of a wear resistant configuration, such as, but not limited to a surface hardfacing weld overlay (e.g., a cobalt based weld material), a case hardened layer (e.g., nitriding, carburizing or other diffusion type hardening) and a precipitation hardened material.

The extension member 688 has a base portion 688B (e.g., an elongate or linear segment) that engages the first leaf 652 along an elongate or linear portion thereof. The base portion 688B has a length that extends to and has a terminus 688V that is aligned with the inboard end 662E of the spacer 662. While the terminus 688V is described and shown as being aligned with the inboard end 662E of the spacer 662, the present invention is not limited in this regard as the spacer 662 may be of a shorter or greater length such that the inboard end 662E is spaced apart from the terminus 688V in either direction facing away from the terminus 688V.

Figure 22:
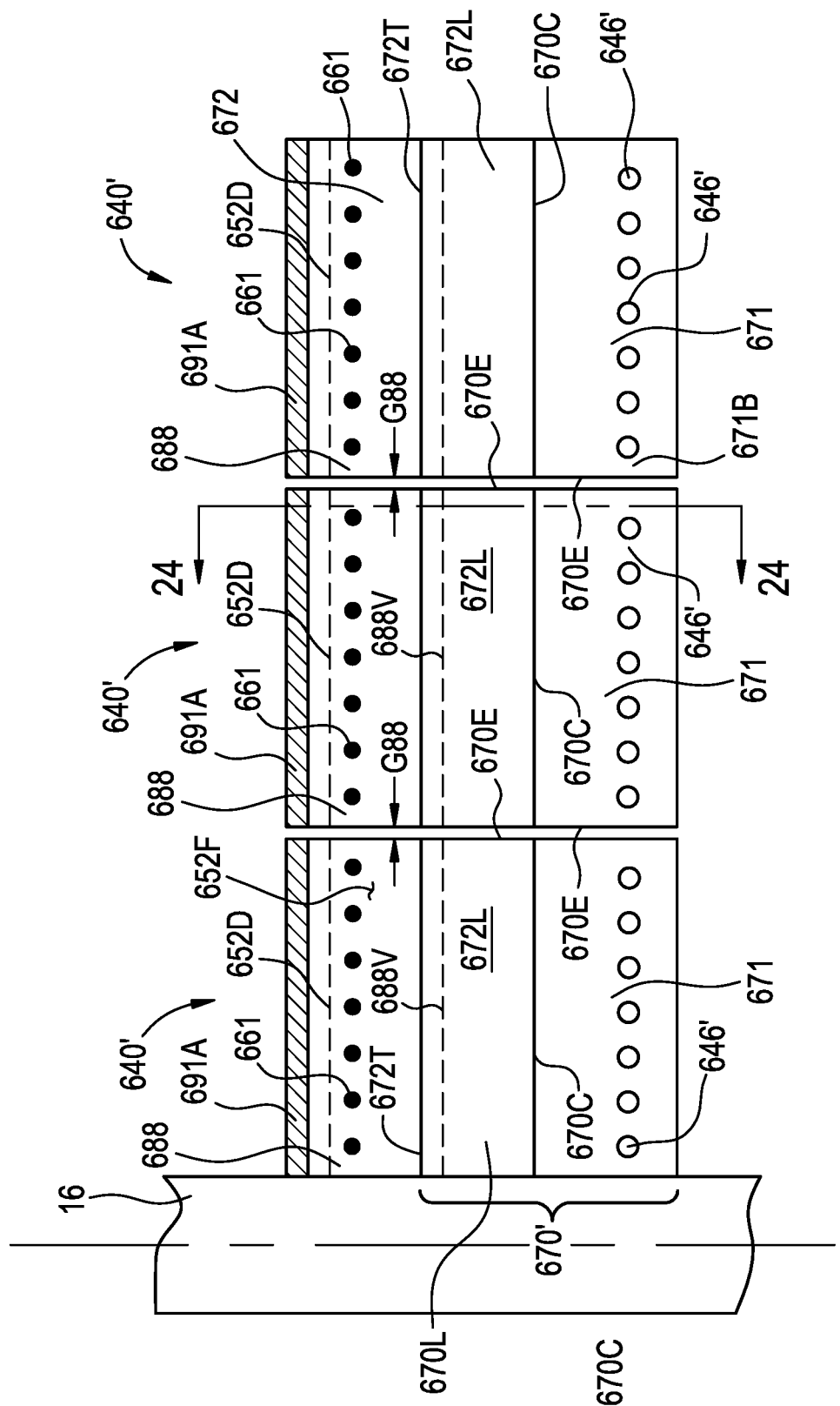
FIG. 22 is a plan view of the seal assembly of FIG. 21 viewed from a leading side of the diaphragm.
Figure 23:
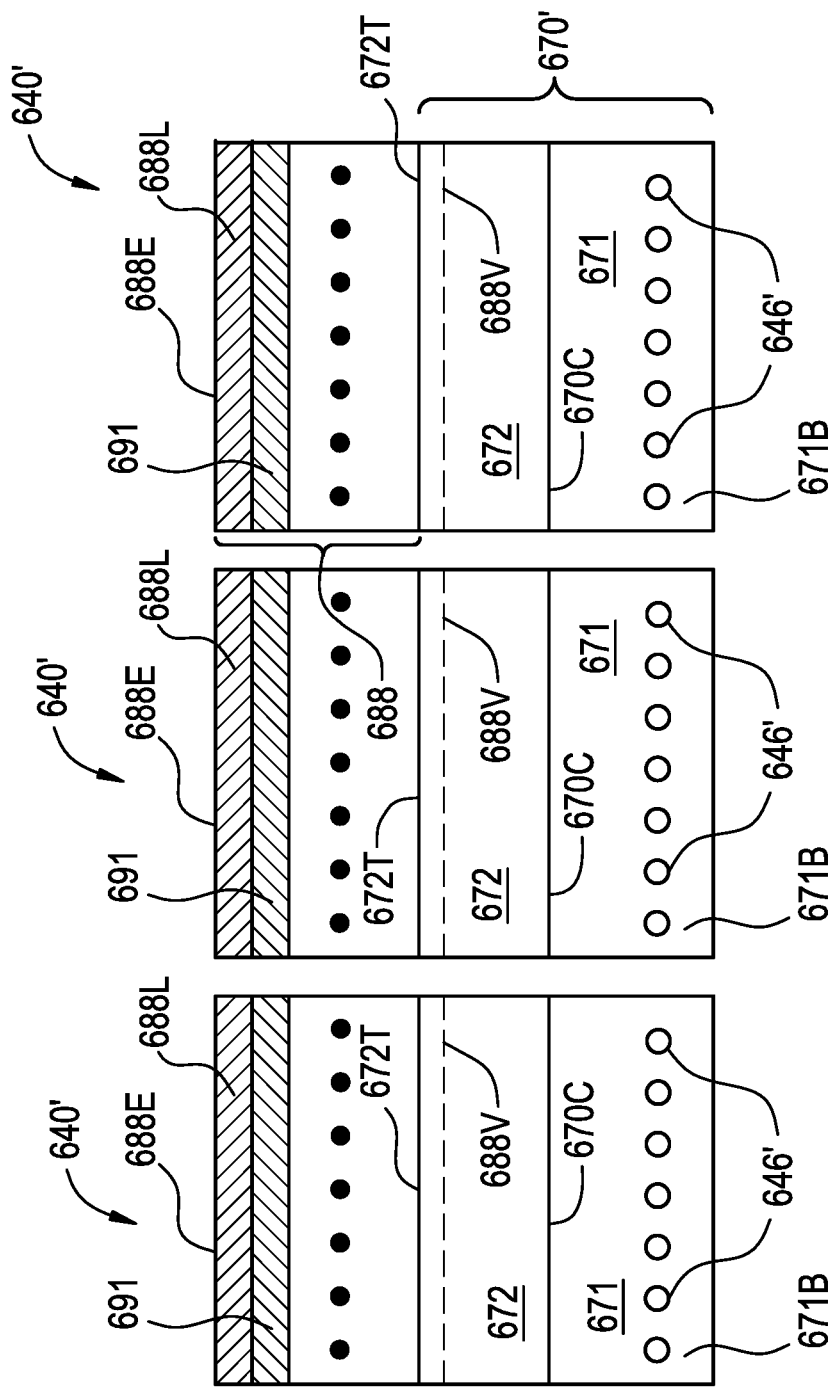
FIG. 23 is a top view of the seal assembly of FIG. 22.
Figure 24:
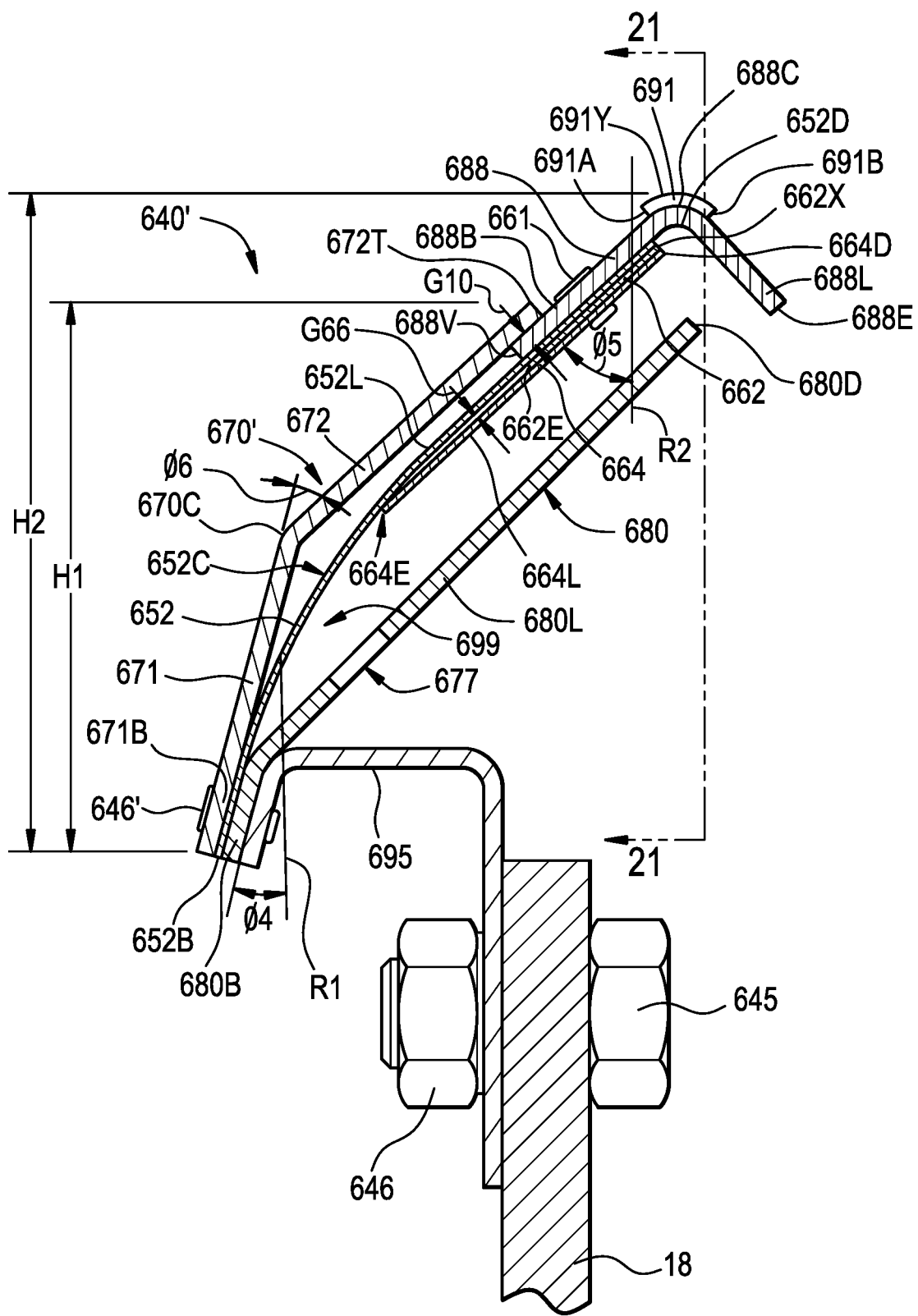
FIG. 24 is a cross sectional view of the seal assembly of FIG. 22 taken across line 24-24 of FIG. 22.

In the exemplary embodiment shown in FIGS. 22-24, the seal assembly 640' includes displacement members 670' that each have a first leg 671 and a second leg 672. The displacement members 670' each have a bend 670C between and joining the first leg 671 and the second leg 672. The second leg 672 has a first engagement portion 672T' (e.g., a linear segment) that slidingly engages a portion of the extension member 688 which has the base portion 688B which has a predetermined thickness T10. The thickness T10 is of a magnitude configured to displace the first leaf 652 away from the displacement member 670' to impart a preload force on the first leaf 652 and to overcome the deflection in the direction of the arrow XX caused by the differential pressure ΔP, as shown in FIG. 20. In one embodiment, the displacement members 670' have a bent cross sectional shape (e.g., having the bend 670C therein) configured to impart the preload force on the first leaf 652 and space the displacement member 670' apart from the first bend 652C of the first leaf 652. The displacement members 670' have a second base section 671B that is secured to the first base section 652B.

As shown in FIGS. 22 and 23 the first leaf 652, second leaf 664 and the spacer 662 are generally rectangular in shape. In one embodiment, as shown in FIG. 24, the displacement members 670' have a height H1 that is of about 70 to about 90 percent of an overall projected height H2 of the seal assembly 640'. In one embodiment, a ratio of the height H1 to the height H2 is a predetermined magnitude to configure the displacement members 670 to be a back-up or secondary seal in the event of failure or loss of the first leaf 652.

Figure 25:
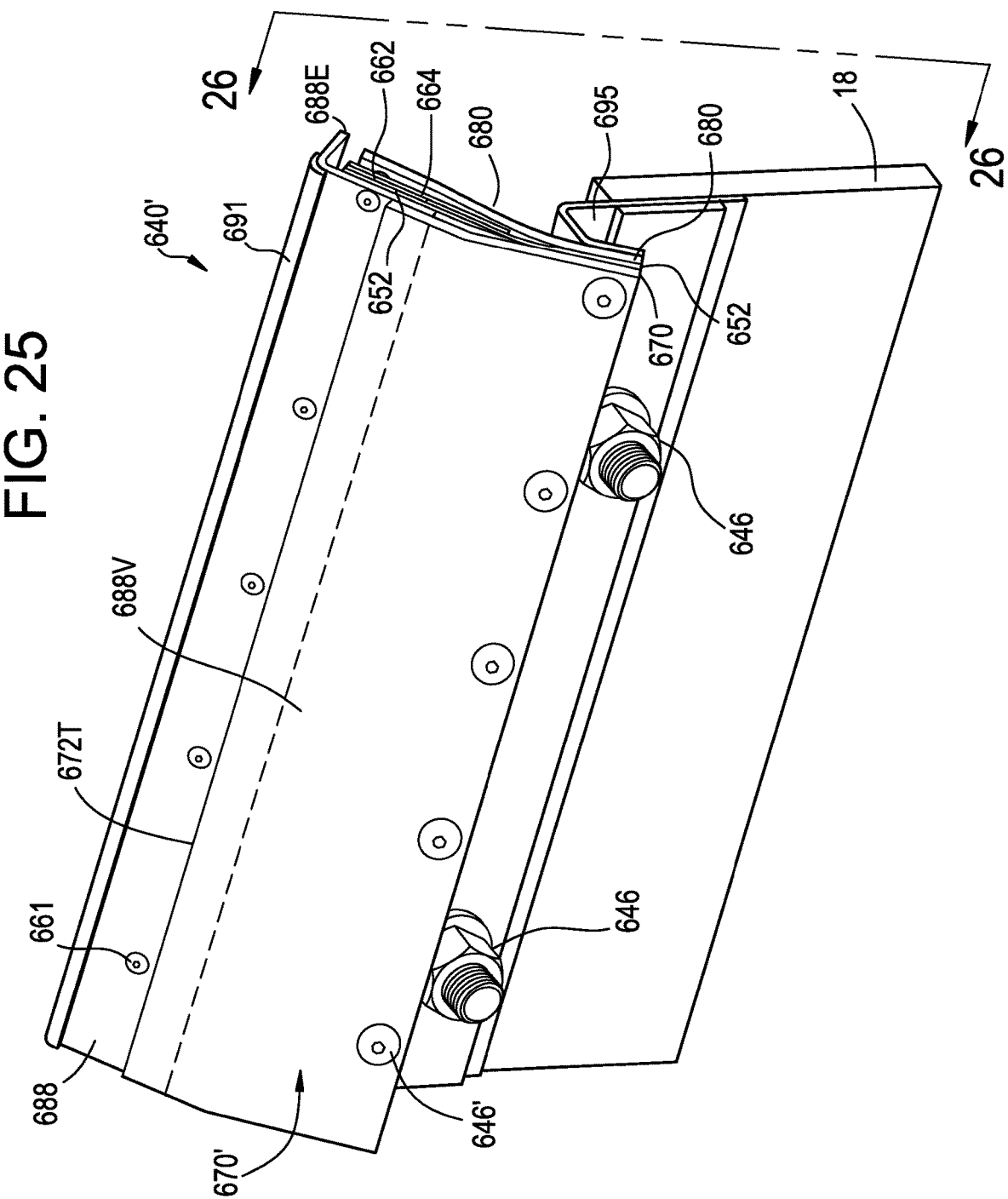
FIG. 25 is a top perspective view of a leading edge of the seal assembly of FIG. 24.

In the exemplary embodiment illustrated in FIGS. 24 and 25, the seal assembly 640' includes a mounting bracket 695. The mounting bracket 695 is configured to orient the first base section 652B at an angle Ø4 of about 5 to 80 degrees from a reference line R1 (e.g., vertical reference line or reference line oriented parallel to the axis A of the rotor post 16), to set a preload force of the seal assembly 640' against a seal plate of the rotary preheater (10). While the angle Ø4 is described as being about 5 to 80 degrees from the reference line R1, the present invention is not limited in this regard as other ranges of angles may be employed including but not limited to about 25 to 40 degrees, about 30 to 40 degrees, or about 30 degrees or greater. In one embodiment, the first leg 671 is oriented at an angle Ø6 of about 10 degrees to about 30 degrees, relative to the second leg 672, to further set the preload force of the seal assembly 640' against a seal plate of the rotary preheater (10). While the angle Ø6 is described as being about 10 to 30 degrees, the present invention is not limited in this regard as other ranges of angles may be employed including but not limited to about 15 to 30 degrees, about 19.3 to 30 degrees, or about 19.3 degrees or greater. In one embodiment, the first leaf 652 is oriented at an angle Ø5 from about 30 degrees to 60 degrees relative to a reference line R2 (e.g., a vertical reference line or reference line oriented parallel to the axis A of the rotor post 16). In one embodiment, the first leaf 652 is configured to impart a substantially constant force on a seal plate over a range of operating loads, for mitigation of wear of the seal assembly 640. While the angle Ø5 is described as being about 30 to 60 degrees from the reference line R2, the present invention is not limited in this regard as other ranges of angles may be employed including but not limited to about 45 to 60 degrees, about 49.5 to 60 degrees, or about 49.5 degrees or greater.

Figure 21:
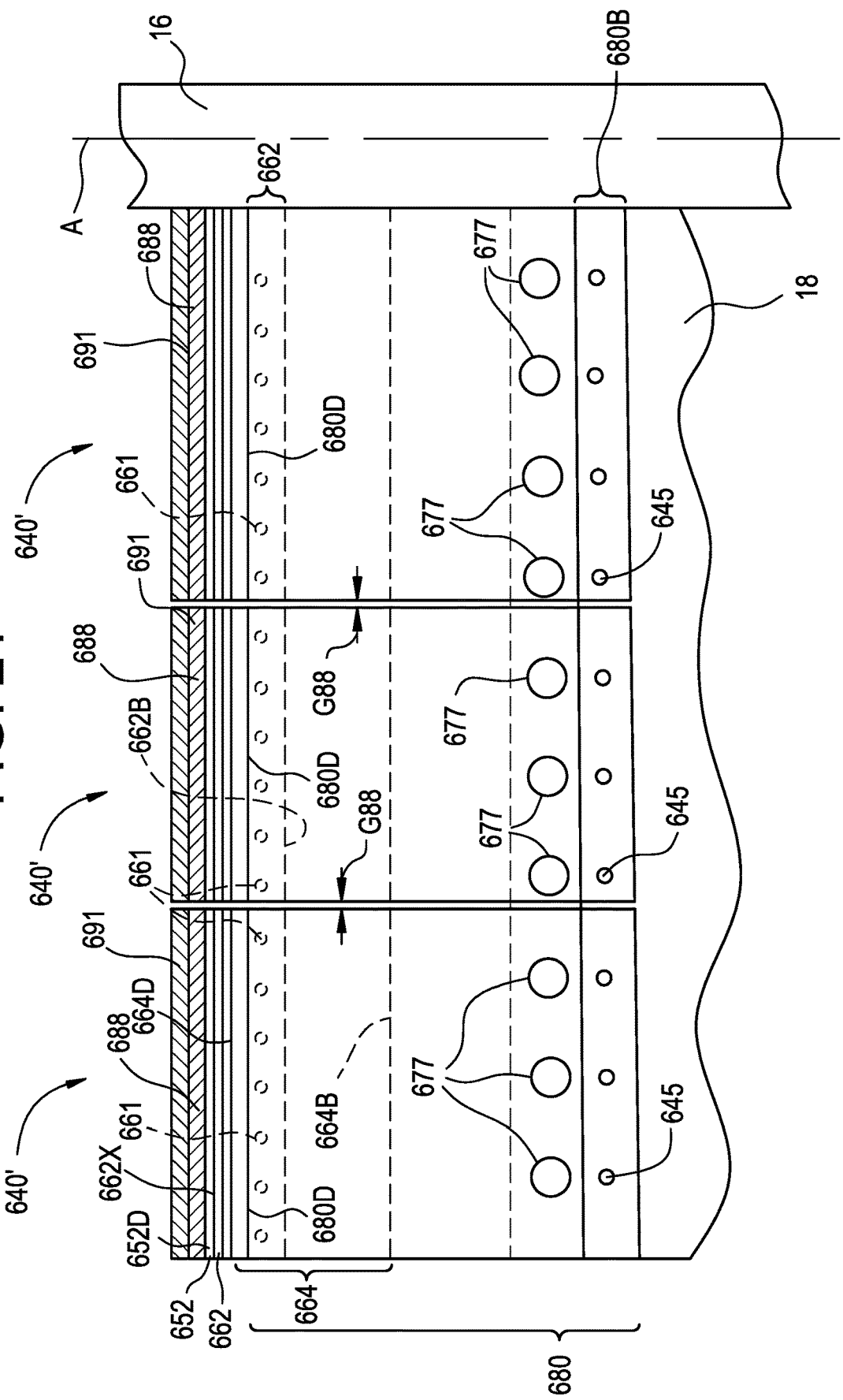
FIG. 21 is a plan view of another embodiment of the seal assembly of the present invention with a wear tip and wear coating, viewed from a trailing side of the diaphragm and taken across section 21-21 of FIG. 24.

As shown in FIGS. 21-23, three of the seal assemblies 640' are shown in a radially segmented configuration and are spaced apart from one another by gaps G88. However, the present invention is not limited in this regard as any number of seal assemblies 640' may be employed and spaced apart from one another by the gaps G88.

As shown in FIG. 22, each of the seal assemblies 640' includes the displacement member 670' which have side edges 670E that are spaced apart from one another by the gap G88. While three displacement members 670' are shown, the present invention is not limited in this regard as the displacement members 670' may be formed in one integral piece or any number of segments to facilitate installation. The first leg 671 defines a base section 671B. The base section 671B defines a fastening area, for example, a flat section and a bore extending therethrough for receiving one of the bolts 645 for securing the displacement member 670 to the mounting bracket 695.

Figure 26:
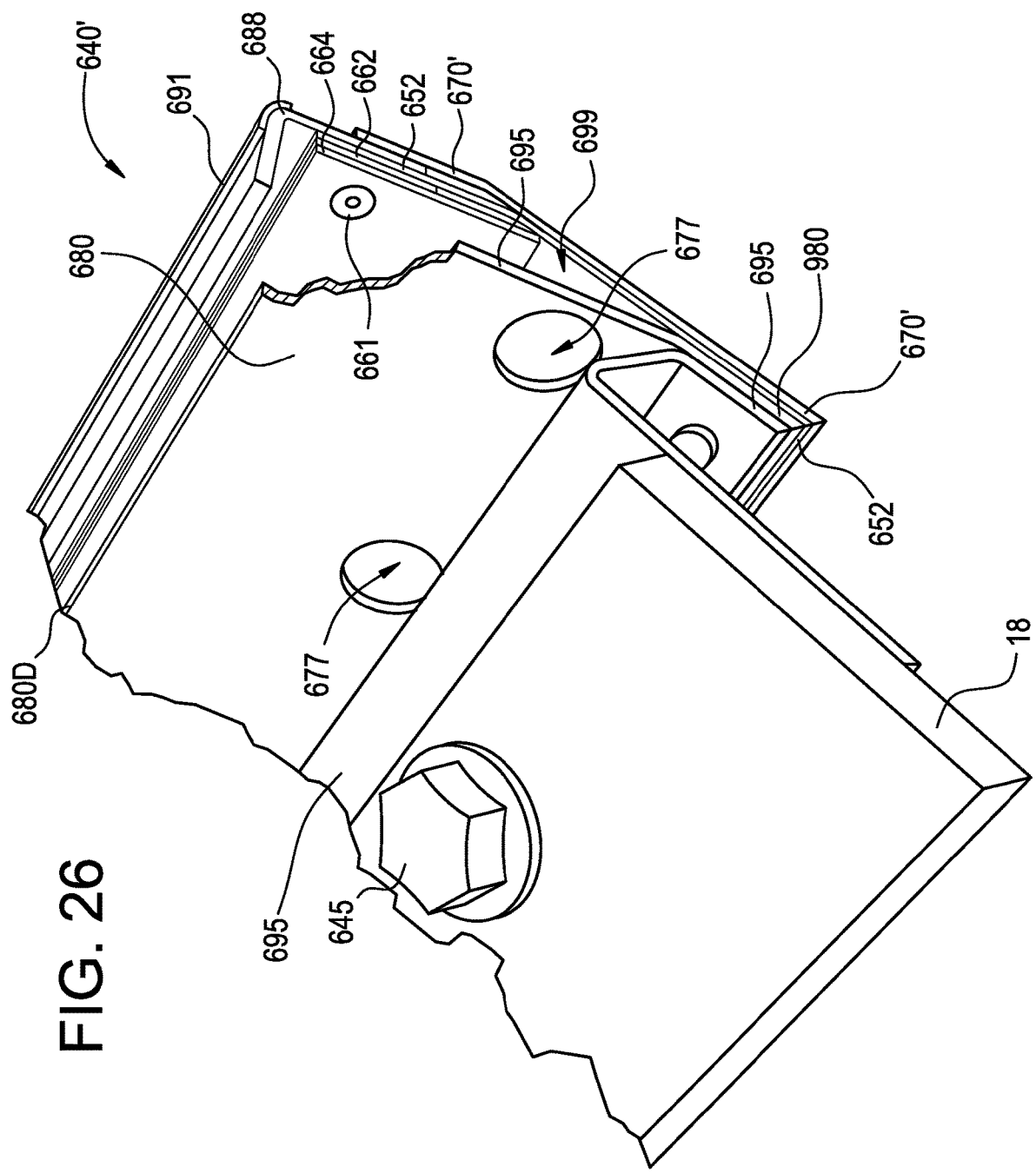
FIG. 26 is bottom perspective view of a trailing edge of the seal assembly of FIG. 24.

As illustrated in FIGS. 21, 24 and 26, the seal assembly 640' for a rotary preheater 10 includes a leaf 652 having a first base section 652B. The first base section 652B has a fastening area for securing the leaf 652 to a diaphragm of the preheater 10. The leaf 652 has a first elongate section 652L that extends away from the first base section 652B. The seal assembly 640' includes a strip 680 that has a third base section 680B that engages the first base section 652B. The strip 680 has a second elongate section 680L that extends away from the third base section 680B. A cavity 699 (e.g., a space, opening, crevice or the like) is formed between the first elongate section 652L and the second elongate section 680L. The strip 680 has a plurality of openings 677 (e.g., holes, ports, slits or the like) extending therethrough. The openings 677 are configured as a discharge port for discharge of material (e.g., fly ash) accumulated in the cavity 699 that could interfere with the flexibility and movement of the first leaf 652. In one embodiment, one or more of the openings are connected together by another opening or channel extending through the strip 680. While the strips 680 are shown and described as having the openings 677 extending therethrough, the present invention is not limited in this regard as the second elongate section 680L of one or more of the strips 680 may be of a continuous solid piece without any openings extending therethrough.

While the seal assembly 640' illustrated in FIGS. 21 and 26 are shown and described as having the openings 677 and cavity 699, the present invention is not limited in this regard as other configurations such as, but not limited to the seal assembly 440 illustrated in FIG. 14 and/or the seal assembly 640 as shown in FIGS. 17 and 20, may also employ the openings 477, 677 for discharge port for discharge of material accumulated in the cavity 499, 699.

The inventors have surprisingly discovered that the sliding engagement of the second leaf 664 with the portion of the first leaf 652 increases the performance and life of the seal assembly 640 by reducing vibration and wear compared to prior art single leaf seals such as those shown in FIG. 2. In addition, the inventors have surprisingly discovered that the seal assemblies 640 and 640' provide further improvement in reducing wear and advantageously altering vibration harmonics over the seal assembly 140 illustrated in FIG. 6. For example, for the seal assembly 640 of FIG. 20, the inventors have surprisingly discovered through analysis and testing, that modification of the seal assembly 140 of FIG. 6 by reducing the number of leafs to two, in particular eliminating the leaf 54 from the seal assembly 140, and configuring the seal assembly 640 with two leafs 652 and 664 with the spacer 662 therebetween, as illustrated and described herein with reference to FIG. 20, further reduced wear and advantageously altered vibration harmonics compared to the seal assembly of FIG. 6. The inventors have surprisingly found that the having a portion of the second leaf 664 (e.g., a corner, edge or exterior surface portion of the second leaf) proximate the terminus 664E slidingly engaging (e.g., is slidingly moveable relative to and in compressive engagement with) a portion of the first bend 652C, provides superior flexibility and range of motion compared to the seal assembly 140 of FIG. 6 in which an elongated portion of the surface of the leafs 54 and 64 slidingly engage each other.

Another advantage of the seal assembly 640 of FIG. 20 as compared to the seal assembly 140 of FIG. 6 is that the localized contact between terminus 664E and the first leaf 652 is likely, once worn in, to lead to consistent contact conditions in a contact area at which any corrosion or debris will be wiped clear during operation. Conversely, with the seal assembly 140 the encapsulation in part of the second leaf 54 in between the first leaf 52 and the third leaf 64 is likely lead to the entrapment of corrosion or debris caught therebetween that at times might have a lubricating effect and at others might result in clogging. While it is not certain how this would affect operation, it will be understood that this would be impossible to measure in real time and the degree of entrapment could require disassembly and inspection. Advantageously, the seal assembly 640 removes the aforementioned entrapment issue as a variable when assessing operational effectiveness.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A seal assembly for a rotary preheater, the seal assembly comprising:
    a first leaf having a first base section and a first substantially straight elongate section extending away from the first base section and terminating at a first distal end thereof, the first leaf having a first bend located between the first base section and the first elongate section;
    a second leaf having a second distal end and a second substantially straight elongate section extending away from the second distal end towards the first base section of the first leaf;
    a spacer positioned between and secured to the first distal end of the first leaf and the second distal end of the second leaf, the spacer extending along a portion of the first elongate section of the first leaf and forming a gap between a portion of the second elongate section and the first elongate section such that the portion of the second elongate section is spaced apart from the first elongate section, the second elongate section extending beyond an inboard end of the spacer and terminating along the first bend of the first leaf, at a terminus of the second leaf, so that the terminus of the second leaf is slidingly moveable relative to and in compressive engagement with a portion of the first bend.

2. The seal assembly of claim 1, further comprising an extension member secured to the first leaf.

3. The seal assembly of claim 2, wherein the extension member has an L-shaped cross section which has an outside corner.

4. The seal assembly of claim 3, further comprising a wear resistant material applied to the outside corner.

5. The seal assembly of claim 2, wherein the extension member has a base portion that engages the first leaf, the base portion extending to and terminating at the inboard end of the spacer.

6. The seal assembly of claim 2, further comprising at least one displacement member, the at least one displacement member having a first engagement portion that slidingly engages a portion of the extension member.

7. The seal assembly of claim 6, wherein the extension member has a base portion that has a predetermined thickness configured to displace the first leaf away from the displacement member to impart a preload force on the first leaf.

8. The seal assembly of claim 6, wherein the at least one displacement member has a bent cross sectional shape configured to impart the preload force on the first leaf and space the at least one displacement member apart from the first bend of the first leaf.

9. The seal assembly of claim 8, wherein the at least one displacement member has a second base section configured to be secured to the first base section.

10. The seal assembly of claim 1, further comprising a strip having third base section engaging the first base section, the first base section being positioned between a second base section and the third base section and the strip defining a deflector section extending away from the third base section and spaced apart from the second leaf.

11. The seal assembly of claim 10, wherein the strip comprises a plurality of openings extending therethrough, the openings being configured as a discharge port for discharge of material accumulated between the strip and at least one of the first leaf and the second leaf.

12. The seal assembly of claim 1, further comprising a mounting bracket configured to orient the first base section at an angle of about 5 to 80 degrees from a reference line, to set a preload force of the seal assembly against a seal plate of the rotary preheater.

13. The seal assembly of claim 1, wherein the first leaf is oriented at an angle from about 30 degrees to 60 degrees relative to a reference line.

14. The seal assembly of claim 1, wherein the first leaf is configured to impart a substantially constant force on a seal plate over a range of operating loads, for mitigation of wear of the seal assembly.

* * * * *